(12) United States Patent  (10) Patent No.: US 8,594,222 B1
Sun et al.  (45) Date of Patent: *Nov. 26, 2013

(54) SYSTEMS AND METHODS FOR EFFICIENT CODEBOOK SEARCHES

(71) Applicant: Marvell International Ltd., Hamilton (BM)

(72) Inventors: Yakun Sun, Sunnyvale, CA (US); Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/672,574

(22) Filed: Nov. 8, 2012

Related U.S. Application Data

(63) Continuation of application No. 12/410,031, filed on Mar. 24, 2009, now Pat. No. 8,311,144.

(60) Provisional application No. 61/041,378, filed on Apr. 1, 2008.

(51) Int. Cl.
  *H04B 7/02* (2006.01)
(52) U.S. Cl.
  USPC .......................................................... 375/267
(58) Field of Classification Search
  USPC .......................................................... 375/267
  See application file for complete search history.

(56) References Cited

U.S. PATENT DOCUMENTS

| 7,934,137 B2 | 4/2011 | Luo et al. |
| 2005/0249298 A1 | 11/2005 | Kim et al. |
| 2006/0161432 A1 | 7/2006 | Zhang et al. |
| 2007/0280386 A1 | 12/2007 | Waes et al. |
| 2008/0037669 A1 | 2/2008 | Pan et al. |
| 2008/0219373 A1 | 9/2008 | Zhang et al. |
| 2009/0086842 A1 | 4/2009 | Shi et al. |
| 2010/0322341 A1 | 12/2010 | Bayesteh et al. |
| 2011/0261675 A1 | 10/2011 | Lee et al. |

OTHER PUBLICATIONS

Choi, J. et al., "Interpolation Based Unitary Precoding for Spatial Multiplexing MIMO-OFDM With Limited Feedback", IEEE Transactions on Signal Processing, vol. 54, No. 12, pp. 4730-4740, Dec. 2006.

IEEE 802.16 Broadband Wireless Access Working Group, pp. 1-13, Jan. 10, 2005.

Love, D. et al., "Limited Feedback Precoding for Spatial Multiplexing Systems", Dept. of Electrical and Computer Engineering, The University of Texas, pp. 1857-1861, Globecom 2003.

Padidar et al., "Codebook-Based Precoding and Power Allocation for Nonregenrative Dual Hop Relay Systems", *Vehicular Technology Conference* (VTC Spring), IEEE $73^{rd}$, pp. 1-5, 2011.

*Primary Examiner* — Juan A Torres

(57) ABSTRACT

Methods and systems are provided for searching for a codeword from a plurality of codewords in a codebook for use in precoding, for example, as used in a multiple-input multiple-output (MIMO) transmission system. Tree search and recursive algorithm techniques may be utilized to reduce the complexity and enhance the efficiency of the codebook search. Distance values may be determined between an optimal codeword and codewords in a codebook. The distance values may be accumulated for a group of the k-best codewords. Additionally or alternatively, a codeword from the codebook may be removed from consideration if the codeword meets a stop rule condition. A codeword may be selected from the codebook based on a minimum distance value from the optimal codeword.

20 Claims, 13 Drawing Sheets

`US 8,594,222 B1`

SYSTEMS AND METHODS FOR EFFICIENT CODEBOOK SEARCHES

This application is a continuation of U.S. patent application Ser. No. 12/410,031, filed Mar. 24, 2009, now U.S. Pat. No. 8,311,144, which claims the benefit under 35 U.S.C. §119(e) of U.S. Provisional Application No. 61/041,378, filed Apr. 1, 2008, which are hereby incorporated by reference herein in their entireties.

BACKGROUND OF THE DISCLOSURE

The disclosed technology relates generally to methods and systems for applying tree search and recursive based algorithms for codebook searches, and more particularly to codebook searches in a closed-loop multiple-input multiple-output (MIMO) transmission or storage system.

With the continuing demand for higher-speed digital communications systems and higher-density digital storage systems, various techniques have been applied to increase the efficiency of these systems. For example, closed-loop MIMO precoding may greatly increase spectrum efficiency and improve receiving quality in such systems. These techniques are so effective, that they have been widely adopted in many wireless and communication standards. However, in some cases the increase in spectrum efficiency and receiving quality comes at a cost. In particular, the added step of searching for an "optimal" precoding parameter may deteriorate the performance of such systems; in some case the performance degradation may be quite substantial.

In many cases, the precoding may be implemented using codewords that are derived from predetermined codebooks, which may be defined by a particular standard for communication. These codebooks may range in the number of codeword entries as well as in the size of the entries themselves. In a communications or storage system, a particular codeword is chosen to precode data streams at a transmitter so that the data streams may be effectively received and used by a receiver. During the normal course of operation of the system, conditions may change in the communication channel such that the chosen codeword is no longer the best codeword to use for precoding.

In such a situation, it may become necessary to search the codebook for a codeword that may be better suited for precoding a data stream given the current channel conditions. Because of the size of many codebooks, this search may be quite time and resource intensive. Thus, it becomes difficult to effectively and efficiently search through a codebook for the best codeword.

SUMMARY OF THE DISCLOSURE

Methods and system for searching for a codeword from a plurality of codewords in a codebook for use in precoding are disclosed that may reduce the complexity and enhance the efficiency of the codebook search. For example, methods and systems are disclosed in which tree search and/or recursive algorithm techniques may be utilized when computing distance values based on the distances between the optimal codeword and the codewords in the codebook. Such tree search and/or recursive algorithm techniques may enhance the efficiency of the codebook search.

In an embodiment, a system is provided for performing a tree search for a codeword from a plurality of codewords in a codebook for use in precoding. In some embodiments, the system may include a memory that may be used to store a codebook with a plurality of codewords. In some embodiments, the system may include a processor that may be capable of determining an optimal codeword based on current channel conditions. After determining the optimal codeword, the processor may determine distance values between the plurality of codewords from the codebook and the optimal codeword. A group of the k-best codewords may be determined, where k may be any suitable integer. The processor may then accumulate the determined distance values with previously determined distance values for at least the group of the k-best codewords. The processor may then select a codeword based on the minimum distance to the optimal codeword.

In an embodiment, a system is provided for recursively searching for a codeword from a plurality of codewords in a codebook for use in precoding. In some embodiments, the system may include a memory that may be used to store a codebook with a plurality of codewords. In some embodiments, the system may include a processor that may be capable of determining an optimal codeword based on current channel conditions. After determining the optimal codeword, the processor may determine distance values between the plurality of codewords from the codebook and the optimal codeword. The processor may then accumulate the determined distance values with previously determined distance values. A codeword from the codebook may be removed from consideration if the codeword meets a stop rule condition. The processor may then select a codeword based on the minimum distance to the optimal codeword.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout.

DETAILED DESCRIPTION OF THE DISCLOSURE

The disclosed invention provides a technique in a closed-loop multiple-input multiple-output data transmission or storage system to perform a search codebook search.

Multiple-input multiple-output (MIMO) systems may be used to improve link reliability and throughput in different environments. For many systems, applying a precoding algorithm at the transmitter may further improve the MIMO system performance by, for example, modifying a data stream based on a precoding value or matrix of values that is optimized for the channel used during transmission. This technique may, for example, increase spectrum efficiency, increase the received signal power, and reduce error rates.

Various types of systems, for example WiMAX, may employ a type of precoding scheme that involves searching through a predetermined codebook for a codeword to use for precoding in the present channel. In some embodiments, the codeword search takes place at a receiver in a communications system. Once the receiver determines a codword from the codebook, the receiver may communicate this information to a transmitter via a feedback channel. The transmitter may thus employ the newly determined codeword for precoding future transmissions.

Figure 1:
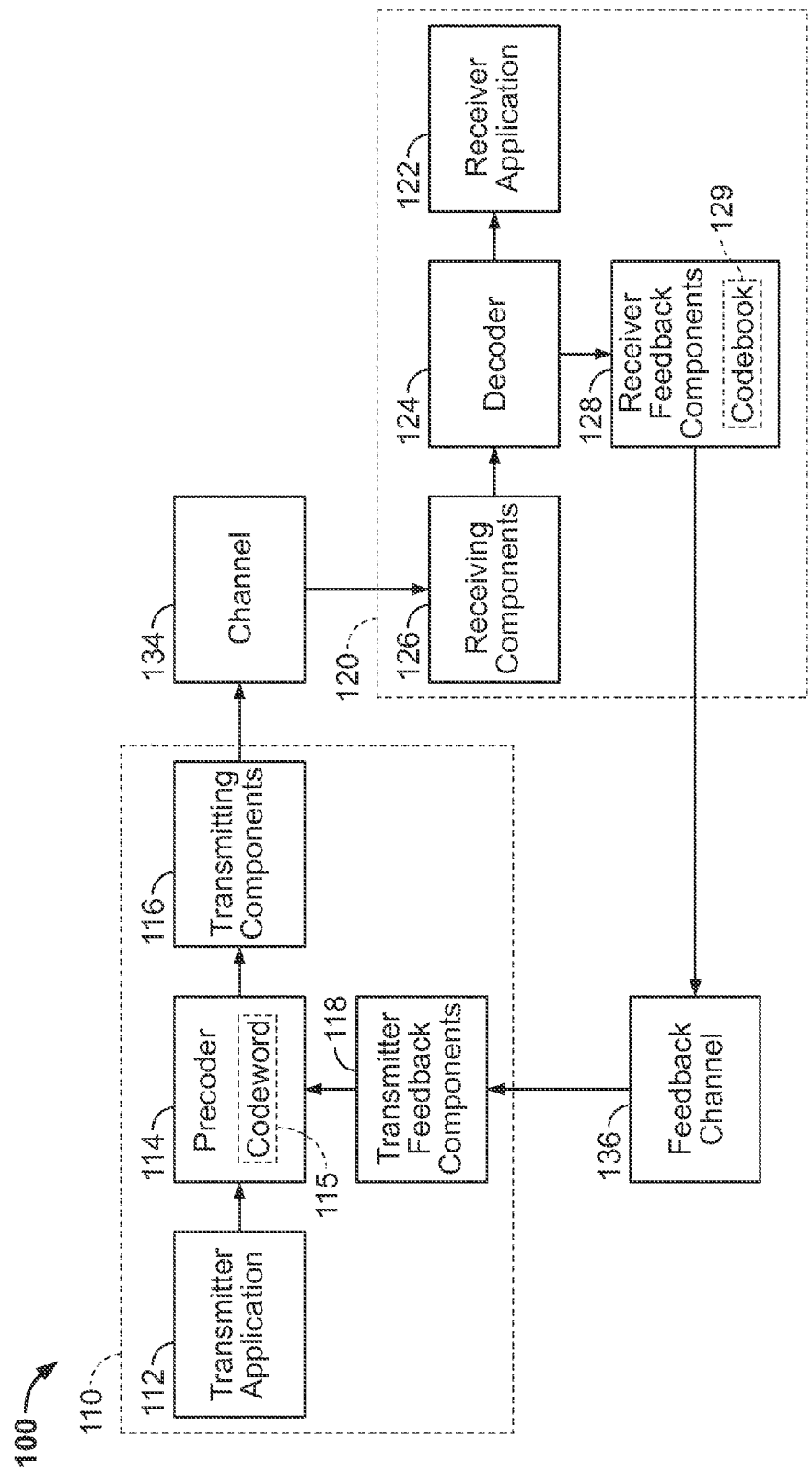
FIG. 1 shows a simplified block diagram of a closed-loop communications or storage system that utilizes precoding techniques.

FIG. 1 shows an illustrative communications system 100 of a basic closed-loop MIMO communications or storage system in accordance with an embodiment of the present invention. System 100 may include transmitter 110 and receiver 120. Transmitter 110 may include transmitter application 112, precoder 114, transmitting components 116, and transmitter feedback components 118. Receiver 120 may include receiver application 122, decoder 124, and receiving components 126, and receiver feedback components 128. Transmitter 110 and receiver 120 may communicate using transmitting components 116 and receiving components 126 respectively across channel 134 and/or feedback channel 136.

Transmitter application 112 and receiver application 122 may be of any type of hardware or software application that produces, uses, and/or receives any type of data. The data may be presented in any suitable form, for example, as a data stream, data symbol, data packet, data bits, data signal, or any other suitable form of data. The data may pertain to audio information, video information, image information, financial information, communications information, or any other type of information that may be represented in digital or analog form.

In some embodiments, transmitter application 112 may produce data that may be passed to and received by precoder 114. Precoder 114 may be capable of performing and applying any type of precoding algorithm to the data received from transmitter application 112, such that the data may be prepared for transmission. For example, precoder 114 may add redundancy codes to the data so that the data may be effectively and/or efficiently transmitted to receiver 120.

Precoder 114 may also include one or more encoders to encode the data to improve transmission efficiency and reduce errors. Such encoders may be capable of encoding the data based on, for example, CRC, LDPC, Turbo, Reed-Solomon, convolutional, or block codes, or any other suitable code. One or more interleavers may also be included in addition to or instead of the encoders. The precoding and/or encoding processing completed at precoder 114 may be preformed in hardware and/or software.

In some embodiments, precoder 114 may apply weights to data based on values found in a codeword, for example codeword 115, which may be found by searching through, for example, codebook 129. Codeword 115 may be chosen for use in precoding (among other codewords in codebook 129) because, for example, codeword 115 may satisfy particular objectives. The search through codebook 129 for codeword 115 may be optimized by utilizing tree search and/or recursive based techniques. Such embodiments are described in greater detail below.

After the precoding process is completed by precoder 114, the processed data may be passed to transmitting components 116. Transmitting components 116 may be of any suitable form and may be comprises of any suitable components such that it is capable of transmitting the data produced by transmitter application 112 and processed by precoder 114 across channel 134 to receiver 120. For example, transmitting components 116 may include one or more antennas, modulators, encoders, buffers, memory modules, filters, amplifiers or any other suitable component. In some embodiments, wherein there are multiple antennas at transmitter 110, spatial multiplexing may be used to transmit the data. For example, transmitter 110 may separate data into a plurality of different information sequences, such as data streams, and may transmit each stream using a different antenna. The streams themselves may be grouped into data packets and/or symbols. All the components included in transmitting components 116 may perform their functions in software and/or hardware.

After transmitting components 116 complete any pretransmission processes, transmitting components 116 may transmit the data in any suitable form in any suitable transmission or playback medium to receiver 120. This medium is illustrated as channel 134 in FIG. 1. Channel 134 may represent any suitable transmission or storage medium or media. The data traversing channel 134 may be altered by, for example, additive noise. Any suitable form of transmitted data may include, for example, analog or digital version of the data modulated based on any suitable modulation scheme, such as, a Binary Phase-Shift Keying (BPSK) signal, Phase-Shift Keying (PSK) signal, Frequency-Shift Keying (FSK) signal, analog Quadrature Amplitude Modulation (QAM) signal, orthogonal frequency-division multiplexing (OFDM), or any other suitable analog or digital signal. Any suitable transmission or storage media may include, for example, any suitable physical or wireless connection that may be capable of propagating and/or storing data, for example, an electrical or optical data signal. Channel 134 may include one or more channels or varying bandwidth with any suitable center frequency. In some embodiments, the modulated data streams may be transmitted using multiple subcarriers. Therefore, transmitter 110 may output a plurality of spatial signal and/or a plurality of frequency-based signals. For simplicity in describing embodiments of the invention, a transmitter subcarrier output will hereinafter be referred to simply as an output.

After transmitting components 116 transmit the data through channel 134, receiver 120 may receive the data via receiving components 126. Receiving components 126 may include any suitable software and/or hardware necessary to receive the transmitted data and transform the data into a useable format for receiver 120. For example, receiving components 126 may include one or more antennas, demodulators, decoders, buffers, memory modules, filters, amplifiers or any other suitable component. A useable format may include, for example, a digital and/or analog version of the data. In some embodiments, wherein the data is transmitted from transmitter 110 across multiple frequencies and/or subcarriers, receiving components 126 may include any suitable software and/or hardware for substantially determining the transmitted data from the received data.

Once the received data is received and converted into a suitable form, the data may be passed to decoder 124. Decoder 124 may decode the data precoded by precoder 114. For example, decoder 124 may be capable of decoding the redundancy codes produced by precoder 114 to acquire data that is substantially the same as data that was produced by transmitter application 112. For example, decoder 124 may include decoder capable of CRC, LDPC, Turbo, Reed-Solomon, convolutional, or block codes, or any other suitable code. In some embodiments, a codeword, for example codeword 115, that may have been used by precoder 114 to precode data may be known by decoder 124. Decoder 124 may thus utilize the known codeword on the received signal in order to decode the data.

After decoding is completed by decoder 124, decoded data may be passed to receiver application 122. Receiver application 122 may be any type of hardware or software application that produces, uses, and/or receives any type of data or data stream. In some embodiments, the data utilized by receiver application 122 may pertain to substantially the same type of information utilized by transmitter application 112.

In some embodiments, the data from decoder 124 may be passed to receiver feedback components 128 instead of or in addition to receiver application 122. Receiver feedback components 128 may be capable of processing the received data in order to, for example, determine a channel estimate or estimate a channel transfer function representing channel 134 and/or determine characteristics about channel 134. These characteristics may include, for example, signal-to-noise ratio (SNR), noise level, error rate, means squared error, mutual information, outage, or any other suitable characteristic. In some embodiments, receiver feedback components 128 may utilize the determined channel estimate, estimated channel transfer function, and/or other calculated characteristics to determine any suitable parameter to be used by precoder 114.

In some embodiments, receiver feedback components 128 may include codebook 129. In such embodiments, a suitable codeword, for example codeword 115, may be found to be used by precoder 114 for precoding data in transmitter 110. As mentioned above and described in further detail below, the codeword may be determined by searching through codebook 129 and the search through codebook 129 may be optimized by utilizing tree search and/or recursive based techniques. In such embodiments, once the suitable codeword is determined, information regarding the determined codeword may be communicated to transmitter 110.

It should be noted that the computation and/or utilization of the channel estimate, channel transfer function, and/or channel characteristics may be completed wholly in transmitter 110. In such an embodiment, receiver feedback components 128 may transmit to transmitter 110 information necessary for computing or estimating desired information. For example, receiver feedback components 128 may transmit "raw" data received from channel 134 and communicate the data to transmitter 110 for analysis. In some embodiments, the channel analysis may be split in any suitable manner between transmitter 110 and receiver 120, and the components thereof.

Once a suitable parameter is determined by receiver feedback components 128, the suitable parameter and/or relevant data may be communicated to transmitter 110 via feedback channel 136 and transmitter feedback components 118. Feedback channel 136 may be part of channel 134 or may be an entirely different channel. In some embodiments, the feedback transmission may be completed by utilizing transmitting components 116 and receiving components 126 in lieu of or in addition to transmitter feedback components 118 and receiver feedback components 128. In some embodiments, the communication between transmitter 110 and receiver 120 across feedback channel 136 may be completed by using slower, less efficient, or less accurate means when compared to the communications across channel 134.

When transmitter feedback components 118 receive the parameter information or relevant data from receiver feedback components 128, transmitter 110 may update information in precoder 114 with the received parameter information or information based on the received relevant data so that precoder 114 may process data based on the information received. For example, precoder 114 may initially use codeword $W_1$ (instead of codeword 115) to precode the data before transmission. during the communication process, receiver feedback components 128 may determine that codeword $W_2$ is a codeword better suited for use in precoding, given the conditions of channel 134. Once the determination that codeword $W_2$ is to be used for precoding is made, information regarding this decision may be transmitted by receiver feedback components 128 to transmitter feedback components 118 via feedback channel 136. For example, the codeword $W_2$ or information that allows transmitter 110 to find or calculate codeword $W_2$ may be transmitted to transmitter feedback components 118. Upon receipt by transmitter 110, precoder 114 may be updated with the determined codeword $W_2$, and may begin precoding all subsequent data based on codeword $W_2$.

In order for receiver feedback components 128 or transmitter 110 to determine a suitable parameter for precoding or processing data prior to transmission, a channel estimate or an estimated channel transfer function may first be calculated. Alternatively, the determination of the suitable parameter may be based on a predetermined channel estimate and/or channel transfer function.

Figure 2:
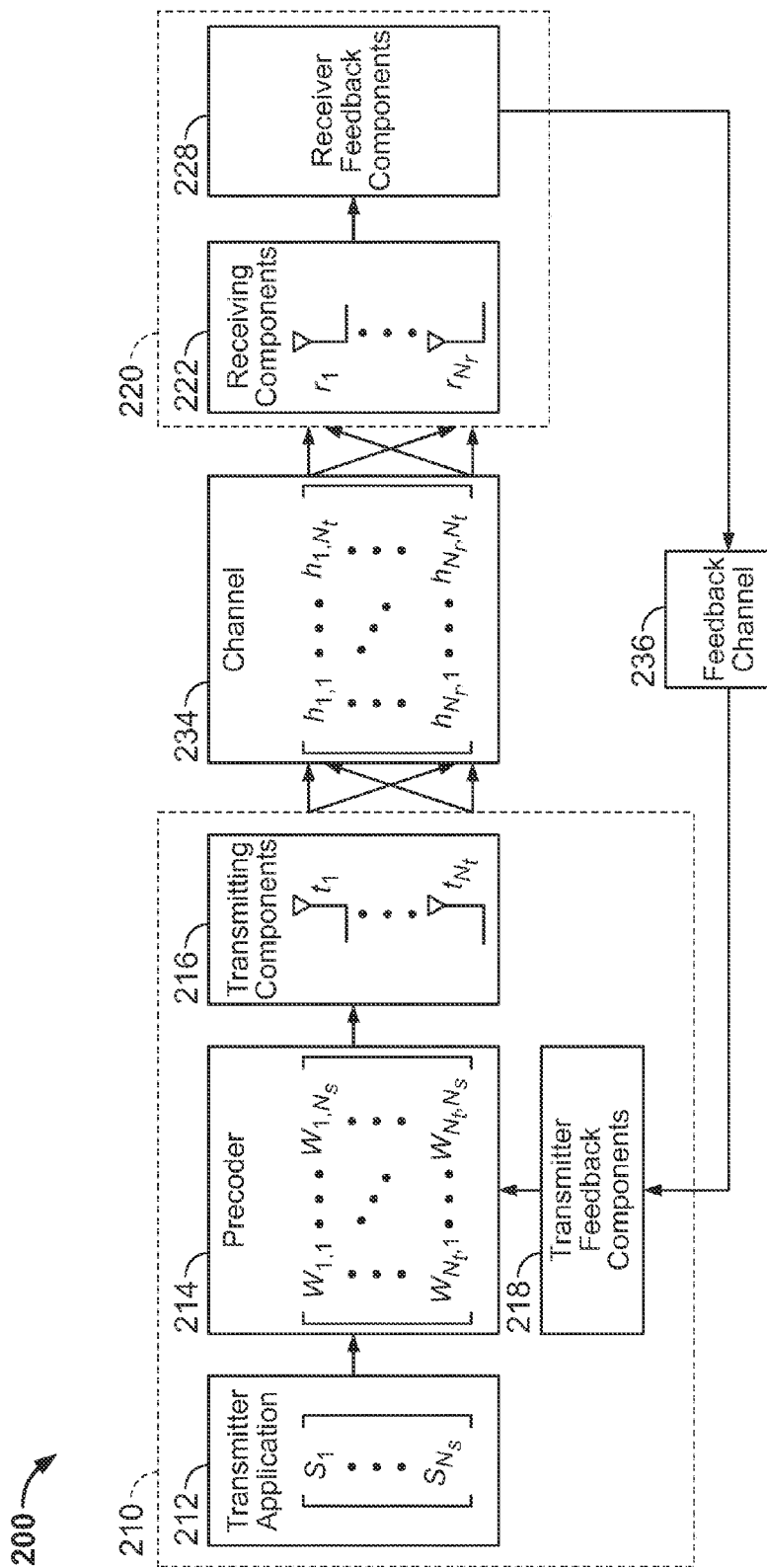
FIG. 2 shows a simplified block diagram of a closed-loop multiple-input, multiple-output (MIMO) system that utilizes precoding techniques.

In some embodiments, system 100 of FIG. 1 may be a closed-loop MIMO system and channel 134 may be a MIMO channel with $N_t$ inputs and $N_r$ outputs, wherein $N_t$ is the number of antennas in transmitter 110 and $N_r$ is the number of antennas in receiver 120. Such an embodiment is illustrated by FIG. 2. System 200 may include transmitter 210 and receiver 220, each of which may be analogous to transmitter 110 and receiver 120 of FIG. 1, respectively. Transmitter 210 may comprise transmitter application 212, precoder 214, transmitting components 216, and transmitter feedback components 218; each analogous to transmitter application 112, precoder 114, transmitting components 116, and transmitter feedback components 118 of FIG. 1, respectively. Receiver 220 may comprise receiving components 226 and receiver feedback components 228; each analogous to receiving components 126 and receiver feedback components 128 of FIG. 1, respectively. System 200 may further comprise feedback channel 236, which may be analogous to feedback channel 136 of FIG. 1, such that receiver 220 may feedback information relevant to precoding to transmitter 210 over feedback channel 236.

In some embodiments, the channel may be represented by channel 234 (which may be analogous to channel 134 of FIG. 1) and the channel transfer function, H, which may be an $N_r \times N_t$ matrix. Due to channel properties, the signal received by each subcarrier input of receiver 220 (e.g., the first subcarrier input on antenna $r_r$) may be based on signals from multiple transmitter antennas (e.g., the first subcarrier output of $t_1, \ldots, t_{Nt}$) of transmitter 210. In particular, the $k^{th}$ subcarrier of the signal received by $r_1$ may be a linear combination of the signals provided by transmitter antennas $t_1, \ldots, t_{Nt}$ for that subcarrier. Thus, in matrix form, system 200 may be modeled by the equations, $$R_k = H_k T_k + G_k, \quad (1)$$

and $$\begin{bmatrix} r_1 \\ \vdots \\ r_{N_r} \end{bmatrix}_k = \begin{bmatrix} h_{1,1} & \cdots & h_{1,N_t} \\ \vdots & \ddots & \vdots \\ h_{N_r,1} & \cdots & h_{N_r,N_t} \end{bmatrix}_k \begin{bmatrix} t_1 \\ \vdots \\ t_{N_t} \end{bmatrix}_k + \begin{bmatrix} G_1 \\ \vdots \\ G_{N_r} \end{bmatrix}_k. \quad (2)$$

Here, equation (2) is an expanded version of equation (1), where $R_k$ is an $N_r$-dimensional signal vector associated with the $k^{th}$ subcarrier, and where the components of the vector represent the signals received by the $N_r$ inputs of receiver 220. $H_k$ is an $N_r \times N_t$ matrix associated with the $k^{th}$ subcarrier and represents the effect of channel 234 on a transmitted signal vector, and may be referred to as a channel transfer function matrix. The channel transfer function matrix may be predetermined and stored in any suitable memory or may be estimated based on a channel estimation and may be determined during the operation of system 200. In either case, $H_k$ may be stored in receiver 220 and/or transmitter 210 in any suitable storage device, for example, ROM, RAM, or FLASH memory. $T_k$ is an $N_t$-dimensional signal vector representing the $N_t$ spatial data streams transmitted by the $N_t$ transmit antennas of transmitter 210 on the $k^{th}$ subcarrier. $G_k$ is an $N_r$-dimensional signal vector representing additive noise on the $k^{th}$ subcarrier received by receiver 220's $N_r$ antennas. While additive noise, represented by $G_k$, may be present in many embodiments of this invention, for simplicity, additive noise is assumed to be negligible in the equations that follow, and hence is not represented in FIG. 2. One of ordinary skill in the art would be able to utilize the equations and/or systems described herein when noise is assumed to be non-negligible without departing from the scope of the present invention.

It should be understood that the enumeration of transmitter antennas (e.g., $t_1, \ldots, t_{Nt}$) and receiver antennas (e.g., $r_1, \ldots, r_{Nr}$) are for convenience only, and are not meant to suggest a particular ordering of the antennas. For example, it should not be assumed that the numbering is based on a spatial orientation of the various inputs/outputs, or that the enumeration suggests a relative priority of the various inputs/outputs. The enumeration of transmitter outputs and receiver inputs, similarly, does not necessarily suggest a particular ordering of subcarriers, or a relative priority.

In some embodiments, transmitter 210 may precode one or more data streams, represented by $N_S$ streams generated by transmitter application 212, as shown in FIG. 2. The $N_S$ data streams may originate in transmitter application 212 and may be precoded using, for example, codewords. In such embodiments, system 200 may be modeled by the equations (assuming noise to be negligible), $$R_k = H_k W_k S_k, \quad (3)$$

and $$\begin{bmatrix} r_1 \\ \vdots \\ r_{N_r} \end{bmatrix}_k = \begin{bmatrix} h_{1,1} & \cdots & h_{1,N_t} \\ \vdots & \ddots & \vdots \\ h_{N_r,1} & \cdots & h_{N_r,N_t} \end{bmatrix}_k \begin{bmatrix} w_{1,1} & \cdots & w_{1,N_S} \\ \vdots & \ddots & \vdots \\ w_{N_r,1} & \cdots & w_{N_r,N_S} \end{bmatrix}_k \begin{bmatrix} s_1 \\ \vdots \\ s_{N_S} \end{bmatrix}_k. \quad (4)$$

Here, equation (4) is an expanded version of equation (3), wherein $W_k$ is an $N_t \times N_S$ precoding matrix associated with a codeword and the $k^{th}$ subcarrier. $S_k$ is an $N_S$-dimensional signal vector associated with the $k^{th}$ subcarrier and represents the data streams that may originate in transmitter application 212. By applying codeword $W_k$ to data streams $S_k$, codeword $W_k$ may weigh the data streams in $S_k$ on each of transmitting components 216's $N_t$ antennas in order to, for example, improve system performance given the characteristics of channel 234 or optimize performance based on desired objectives. $H_k$ is analogous to $H_k$ of equations (1) and (2).

In some embodiments, codewords $W_1$, $W_2$, $W_k$, or any other codeword may be derived from a given codebook, denoted as F. Codebook F may be predetermined according to a transmission standard or method, for example, adaptive modulation and coding (AMC) in WiMAX frequency division duplexing (FDD), IEEE 802.16m, and long-term evolution (LTE) each involve predefined codebooks. Codebook F may be stored in receiver 220 and/or transmitter 210 in any suitable storage device, for example, ROM, RAM, or FLASH memory. In some embodiments, it may be necessary to search through a defined codebook for a codeword that provides the best performance given an objective, set of objectives and/or channel characteristics. For example, codebook F may be a L-bit codebook which comprises $2^L$ codewords. It may be necessary to exhaustively search through codebook F for a codeword such that an objective, or multiple objectives, are optimized when the codeword is utilized for precoding. Objectives to optimize may include, but are not limited to, post-processing SNR, mean squared error (MSE), mutual information, error rate or outage.

In some embodiments, the codebook search may be complex and time consuming because, for example, the computations utilized in optimizing the objectives may be complex and may have to be separately repeated for all available codewords in a given codebook. Hence, to exhaustively search codebook F, which comprises $2^L$ codewords, at least $2^L$ objective optimizing computations may need to be performed before the "optimal" codeword may be determined. Here, the "optimal" codeword may be any codeword that optimizes a solution given particular conditions and/or objectives. In some embodiments, the "optimal" codeword may be a codeword outside of a given codebook. In such embodiments, it may be desirable to find a codeword from a codebook that provides the "best" approximation of the "optimal" solution. As described in greater detail below, the "best" codeword may be the codeword with the smallest distance to the "optimal" codeword.

In some embodiments, the search for the optimal codeword may be represented by the following equation, $$V_{opt} = \underset{W_i \in F\{W_i \ldots W_2 t\}}{\mathrm{argmax}} \ J(HW_i). \quad (5)$$

Here, function $J(\bullet)$ may represent any function or set of functions that optimize for an objective based on the channel transfer function H, and codeword $W_1$, which may be taken from codebook F. $V_{opt}$ is the optimal codeword in codebook F given an objective, channel transfer function H, and codeword $W_1$ taken from codebook F. As shown in equation (5), the optimal codeword may be the codeword $W_1$ that maximizes function $J(\bullet)$. In alternate embodiments, the optimal codeword may be the codeword that minimizes function $J(\bullet)$. If multiple objectives are used to find the optimal codeword, the computation involved in searching for the optimal codeword may become even more complex when compared to the case wherein one objective is to be optimized.

In some embodiments, the optimal codeword may be determined without constraints. For example, the optimal codeword may be found using singular value decomposition (SVD), genetic algorithms, stochastic optimization, heuristic optimization, or neural networks, or any other suitable method. Determining the optimal codeword without constraints may reduce the complexity of the codebook search when compared to the complexity of the objective based optimization described above.

In an embodiment wherein the SVD is utilized, the SVD of the channel transfer function H may be used to find a unitary precoding matrix $V_{opt}$, which may be the optimal precoding matrix. The SVD of the channel transfer function H may be represented by the following equations, $$H = U\lambda V^*_{full}, \quad (6)$$

and $$\begin{bmatrix} h_{1,1} & \cdots & h_{1,N_t} \\ \vdots & \ddots & \vdots \\ h_{N_r,1} & \cdots & h_{N_r,N_t} \end{bmatrix} = \begin{bmatrix} u_{1,1} & \cdots & u_{1,N_r} \\ \vdots & \ddots & \vdots \\ u_{N_r,1} & \cdots & u_{N_t,N_r} \end{bmatrix} \begin{bmatrix} \lambda_1 & \cdots & 0 \\ \vdots & \ddots & \vdots \\ 0 & \cdots & \lambda_{N_t} \end{bmatrix} \begin{bmatrix} v_{1,1} & \cdots & v_{1,N_t} \\ \vdots & \ddots & \vdots \\ v_{N_t,1} & \cdots & v_{N_r,N_t} \end{bmatrix}^*. \quad (7)$$

Here, equation (7) is an expanded version of equation (6), wrehin U is an $N_r \times N_r$ unitary matrix that contains a set of orthonormal output basis vector directions for H. $V_{full}^*$ is the conjugate transpose of $V_{full}$, which is an $N_t \times N_t$ unitary matrix that contains a set of orthonormal input basis vector directions for H. $\lambda$ is an $N_r \times N_t$ diagonal matrix that contains singular values $\lambda_1$ to $\lambda_{Nt}$, wherein $$\lambda_1 > \lambda_2 > \ldots > \lambda_{Nk}, \quad (8)$$

The columns of $V_{full}$ may be sorted according to the descending singular values, i.e., $V_{full} = [v_1 \ldots v_{Nt}]$. The optimal precoding matrix, $V_{opt}$, may thus be the first $N_S$ columns of $V_{full}$ because the dimensino of $V_{opt}$ are at least partially constrained by the number of data streams, $N_S$, i.e., $$V_{opt} = \begin{bmatrix} v_{1,1} & \cdots & v_{1,N_S} \\ \vdots & \ddots & \vdots \\ v_{N_S,1} & \cdots & v_{N_r,N_S} \end{bmatrix}. \quad (9)$$

With this determined optimal code precoding matrix, $V_{opt}$, it may be possible to find a codeword within codebook F by, for example, determining the codeword with the smallest the distance to $V_{opt}$.

In the case wherein the optimal codeword is found without constraints, distance calculations may be performed in order to determine which of the available codewords is closest to the determined optimal codeword. For example, a codeword in a codebook that has the smallest distance to an optimal codeword may be chosen as the "best" codeword given the channel characteristics. The distance may be calculated using any suitable distance calculation, for example, projection 2-norm distance, represented by the following equation, $$D_{proj} = \|W_i W_i^H - V_{opt} V_{opt}^H\|_2 = \sqrt{1 - \lambda_{min}^2(W_i^H F)}, \quad (10)$$

the Fubini-Study distance, represented by the following equation, $$D_{FS} = \arccos|det(W_i^H V_{opt})|, \quad (11)$$

or the chordal distance, represented by the following equation, $$D_{char} = \|W_i W_i^H - V_{opt} V_{opt}^H\|_F, \quad (12)$$

or any other suitable distance calculation. In the case of the chordal distance, $$\|\cdot\|_F$$

is a Frobenius Norm. The chordal distance may be further reduced to the following equation, $$D_{char} = \sqrt{\mathrm{trace}[(W_i W_i^H - V_{opt} V_{opt}^H)(W_i W_i^H - V_{opt} V_{opt}^H)]}, \quad (13)$$

The operations involved in utilizing any suitable distance metric, such as the distance equations described above, may be complex and may need to be repeated for all codebook entries. Furthermore, under certain conditions, the distance calculations may yield a singularity problem. For example, the chordal distance between any two full-rank unitary matrix codewords may equal 0, which makes the codewords indistinguishable, although one of the codewords may provide better performance and may be more preferable. Hence, the distance calculations may not accurately determine the codeword that is closest to the optimal codeword.

In some embodiments, suppose there are two M×N unitary matrices, A and B (e.g., wherein $A^H A = I_N$ and $B^H B = I_N$), the chordal distance shown by equations (12) and/or (13) may be squared and thus may be represented by the following equation, $$D_{char}^2 = \|AA^H - BB^H\|_F^2. \quad (14)$$

Using algebraic simplification, equation (14) may be simplified to the following equation, $$D_{char}^2 = 2N - 2\sum_{n=1}^{N} \|B(:,n)^H A\|^2. \quad (15)$$

This equation may be applied, for example, to the case wherein the chordal distance is to be computed between the optimal codeword and codewords derived from a codebook. In such an embodiment, the best codeword may be determined by the minimum chordal distance between the optimal codeword and codewords derived from a codebook, and thus may be represented by the following equation, $$W_{best} = \underset{1 \le k \le 2^L}{\operatorname{argmin}} D_{char}(V_{opt}, W_k). \quad (16)$$

Here, the best codeword for a particular channel may be the codeword, $W_k$, of $2^L$ codewords in a codebook that may leas to the minimum chordal distance to the optimal codeword, $V_{opt}$. Equation (16) may be further simplified to the following equation, $$W_{best} = \underset{1 \le k \le 2^L}{\operatorname{argmin}} D_{char}(V_{opt}, W_k) = \underset{1 \le k \le 2^L}{\operatorname{argmax}} \sum_{i=1}^{N_s} \|W_k(:,i)^H V_{opt}\|^2. \quad (17)$$

Here, the best codeword, $W_{best}$, (e.g., the codeword that minimizes the chordal distance) may be equivalent to the codeword that maximizes the summation of the square of the norm of the conjugate transpose of the $i^{th}$ column of the $k^{th}$ codeword in a codebook multiplied by the optimal codeword. The summation may take place over each of the $N_S$ columns of the $k^{th}$ codeword. In some embodiments, $N_S$ may be associated with the number of data streams in a MIMO communications system. Equation (17) may be further simplified to the following equation, $$W_{best} = \quad (18)$$

$$\underset{1 \le k \le 2^L}{\operatorname{argmax}} \sum_{i=1}^{N_j} \|W_k(:,i)^H V_{opt}\|^2 = \underset{1 \le k \le 2^L}{\operatorname{argmax}} \sum_{i=1}^{N_s} \sum_{j=1}^{N_s} |W_k(:,i)^H V_{opt}(:,j)|^2.$$

Here, the matrix multiplications of equation (17) are simplified into vector-vector inner-product multiplications. Thus, the best codeword may be the codeword that maximizes the nested summation of the squared magnitude of the vector-vector inner-product between the $i^{th}$ column of codeword $W_k$ and the $j^{th}$ column of codeword $V_{opt}$.

It should be noted that the metrics used to determine the best codeword are not limited to utilizing the chordal distance as described above. Any other suitable distance metric and/or any other suitable parameter may be utilized and/or simplified in a substantially similar manner as described above to determine the best codeword in addition to or instead of the chordal distance. The use of the chordal distance in the best codeword determination is shown purely for illustrative purposes.

Figure 3:
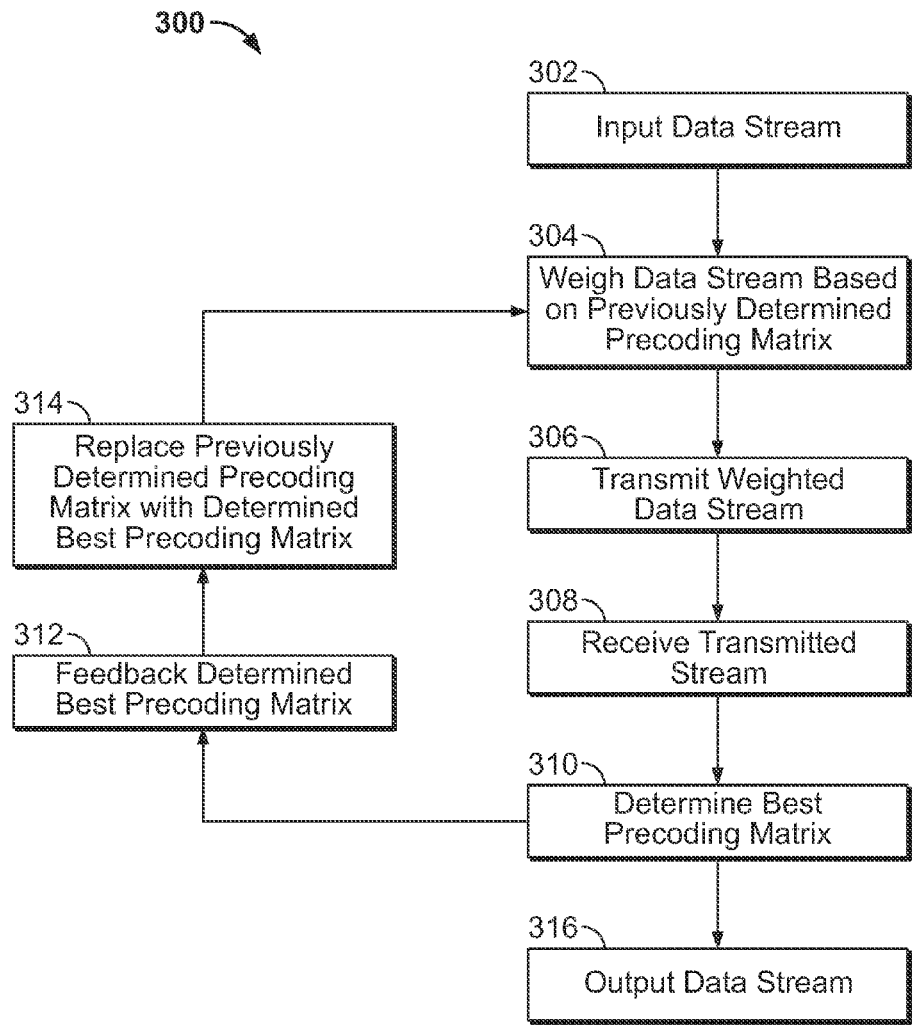
FIG. 3 shows an illustrative flow diagram for determining, updating, and utilizing a chosen precoding matrix in the systems of FIGS. 1 and 2.

FIG. 3 shows an illustrative flow diagram of processes that may be performed in a MIMO system or any suitable communications system, such as system 100 and/or system 200 as described above in connection to FIGS. 1 and 2. It should be understood that any of the following flow diagrams are merely illustrative. Any of the steps illustrated in any of the following flow diagrams may be modified or rearranged, and any additional components may be added, without departing from the scope of the present invention.

Referring now to FIG. 3, illustrative flow diagram 300 is shown for determining, updating, and utilizing a chosen precoding matrix in a system analogous to system 100 and/or system 200 of FIGS. 1 and 2. At step 302, a data stream may be generated and input into a system. The data stream may be generated by a component with any of the properties of transmitter application 112 and/or transmitter application 212 (FIGS. 1 and 2). At step 304, the data streams are weighed according to a particular precoding matrix. The precoding may be completed by a component with any of the properties of precoder 114 and/or precoder 214 (FIGS. 1 and 2). In some embodiments, the precoding matrix may be a codeword derived from a codebook and described above. At step 306, the weighted data stream may be transmitted to a receiver by a transmitter. The transmitter may have any of the properties of transmitter 110 and/or transmitter 210 and the receiver may have any of the properties of receiver 120 and/or receiver 220 (FIGS. 1 and 2). The data streams may be transmitted over a channel which may have any of the properties of channel 134 and/or channel 234 (FIGS. 1 and 2).

At step 308, the receiver may receive the transmitted data stream. The data may be received by any component that may have any of the properties of receiving components 126 and/or receiving components 226 (FIGS. 1 and 2). At step 310, a precoding matrix may be determined. This precoding matrix may be the optimal precoding matrix or the best alternative to the optimal matrix available. As described above, the precoding matrix may be determined based on the characteristics of the channel. Furthermore, the precoding matrix may be a codeword derived from a codebook, which may contain a plurality of codewords. In some embodiments, the codeword may be found by searching through the codebook using any of the techniques described herein, for example, through tree search and/or recursive based algorithms. Step 310 may take place in either receiver 120 (analogous to receiver 220) or transmitter 110 (analogous to transmitter 210), or combination thereof.

At step 312, the found best precoding matrix may be fed back to the transmitter so that the transmitter may begin precoding the data streams with the best precoding matrix. In some embodiments, information that may lead to the best precoding matrix may be fed back to the transmitter so that the transmitter may determine the best precoding matrix to use, as opposed to the determination being completed by the receiver. As described above, the feedback from the receiver to the transmitter may be done over the same channel that the data streams are transmitted over (i.e., channel 134 and/or channel 234 of FIGS. 1 and 2) or an entirely different channel (i.e., feedback channel 136 and/or feedback channel 236 of FIGS. 1 and 2). At step 314, upon receiving or determining the new best precoding matrix, the existing precoding matrix in the transmitter may be updated with the newly determined best precoding matrix. Thus, future data streams may be precoded based on the newly determined precoding matrix.

Figure 4:
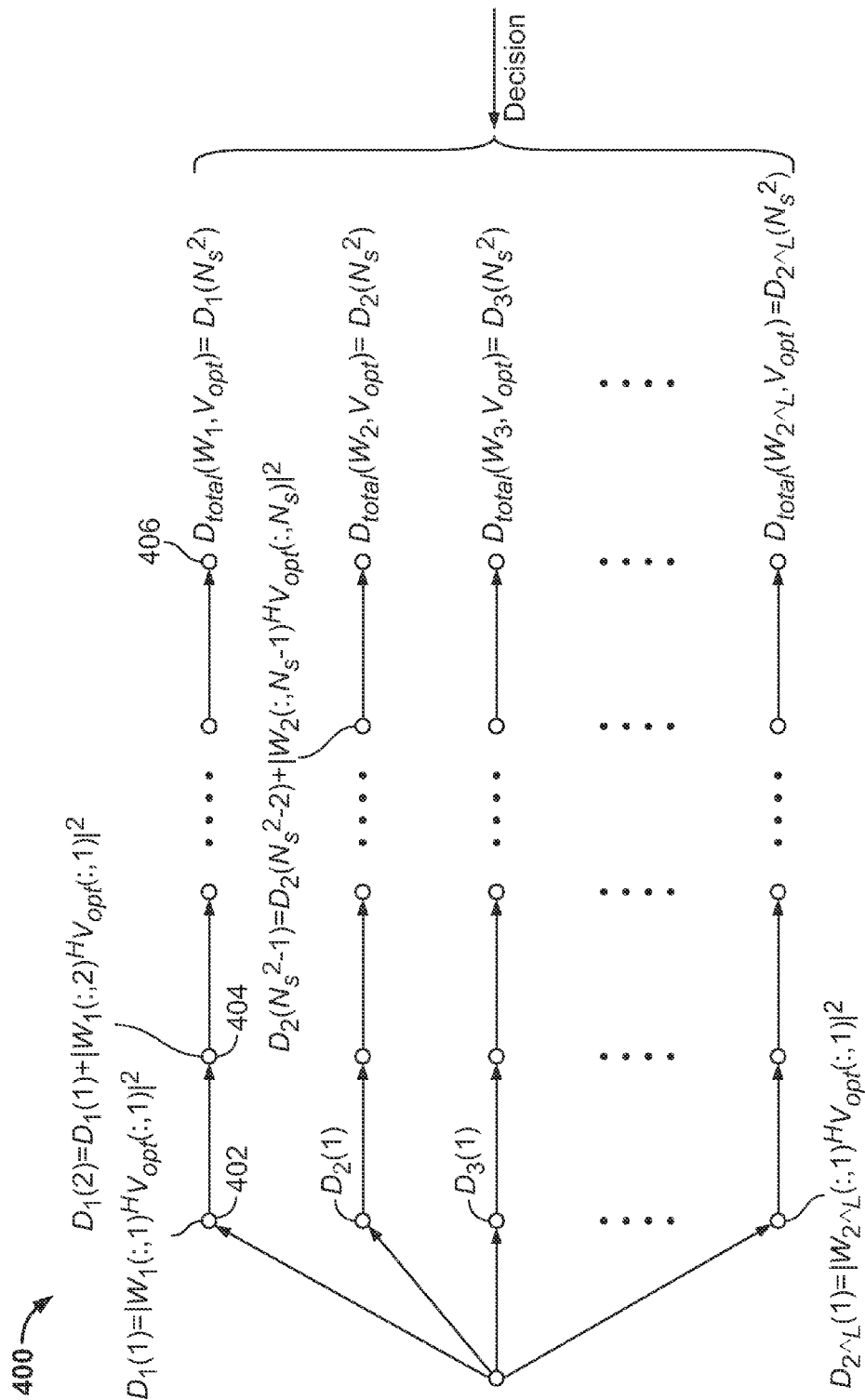
FIG. 4 shows a generalized tree structure diagram relating to a codebook search for the best available codeword for use in precoding.

In some embodiments, the precoding matrix may be based on a codeword derived from a codebook. In order to determine the best codeword to use given channel characteristics and/or objectives, a search through the codebook may be completed. As stated above, in some embodiments, a codebook search may be complex and/or time consuming. In such embodiments, the codebook search may be optimized by utilizing tree search algorithms. A tree search algorithm may be represented by a tree structure diagram, as shown in FIG. 4. In tree structure 400, each node in the structure may represent a calculation between a particular codeword from a codebook and the optimal codeword, for example, the summation of vector-vector inner-product multiplications as described above. The process illustrated by tree structure 400 may be implemented, for example, through an algorithm in software and/or hardware.

In some embodiments, a calculation that may take place at node 402, may be represented by the following equation, $$D_1(1)=|W_1(:,1)^H V_{opt}(:,1)|^2. \quad (19)$$

Here, $D_1(1)$ represents a value associated with the distance between a first codeword from a codebook, $W_1$, and the optimal codeword, $V_{opt}$, based on the first column of $W_1$ and $V_{opt}$. In this embodiment, the distance is derived from a squared magnitude of the vector-vector inner-product multiplication as described above. After the calculation is computed at node 402, the process may proceed to node 404 where a calculation may take place that may be represented by the following equation, $$D_1(2)=D_1(1)+|W_1(:,2)^H V_{opt}(:,1)|^2. \quad (20)$$

Here, $D_1(2)$ represents a value associated with the distance between the first codeword from the codebook, $W_1$, and the optimal codeword, $V_{opt}$, based on the second column of $W_1$, the first column of $V_{opt}$, and the summation of the previously calculated distance value, $D_1(1)$.

These calculations may be repeated for $W_1$ until every column of $W_1$ and $V_{opt}$ are utilized to determine the total distance between $W_1$ and $V_{opt}$. For example, the distance calculations have taken place, where $N_S$ may represent the number of columns in $W_1$ and $V_{opt}$. As described above, $N_S$ may relate to the number of data streams in a MIMO system.

In addition to determining the distance between $W_1$ and $V_{opt}$, a distance value may be determined for every other codeword in the codebook, for example, all $2^L$ codewords as shown in tree structure 400. The calculations at each node may take place simultaneously and/or in any suitable order for any suitable number of codewords. Once a total distance value is computed for all codewords, for example, all $2^L$ codewords as shown in tree structure 400, a decision may be made to determine which codeword from the codebook is the best codeword for use in precoding, as described above. For example, the decision may be based on which codeword may be the minimum distance from the optimal codeword as described above, and/or the decision may be based on any other suitable criteria. In tree structure 400, the maximum $D_{total}$ may be associated with the best codeword.

It should be noted that any suitable calculation may be used to determine any suitable distance and/or any other suitable parameter of the codewords in the codebook based on the optimal codeword for any of the nodes in tree structure 400, or any of the tree structures described below. Furthermore, the calculations may not be limited to column based calculations, for example, the calculations may additionally or alternatively be based on the rows of the relevant codewords and/or the matrices as a whole at each node calculation.

It should be noted any suitable tree search algorithm may be applied in order to perform a codeword search. For example, in some embodiments, subsets of nodes may be kept on each level of the tree structure as an algorithm progresses through the tree structure. In some embodiments, a tree search algorithm may only search through a certain depth of the tree structure. These and other illustrative embodiments are described in greater detail below with regard to FIGS. 5-7.

In some embodiments, not all node may be utilized to determine the best codeword. This may, for example, further increase the efficiency, decrease the computational complexity, and/or reduce the time needed to search for the best codeword from a codebook. For example, as shown with tree structure 500 in FIG. 5, a particular codeword may be determined not to be the best codeword before all distance values are computed for all codewords. For example, the calculation at node 502 may produce a value that meets a condition may signify that the codeword associated with node 502 (e.g., $W_2$) may not the best codeword. For example, the condition may be that the value calculated at node 502 is greater than or less than any suitable predetermined or adaptive threshold. In such an embodiment, the codeword may be discarded from further calculations.

In some embodiments, the k-best codewords may be kept for further calculations at every step through tree structure 500, while the other, for example, $2^L$-k codewords may be removed from consideration, wherein k may represent any suitable integer. In some embodiments, the k-best codeword determination may take place at any suitable iteration through the nodes of tree structure 500. For example, the k-best determination may take place after every other column of nodes is analyzed. Alternatively, whether the k-best codeword determination takes place may vary from iteration to iteration and/or may be adaptive. Furthermore, the value of k may vary iteration to iteration and may be adaptive. In some embodiments, the adaptive nature of the k-best determination may be based on the calculations that may be made in tree structure 500.

In some embodiments, an early-termination error may occur when a codeword is incorrectly discarded as a result of an intermediate metric determination. For example, a codeword, which may actually be the best codeword, may be incorrectly discarded at an intermediate step in a tree search algorithm because a value calculated at a particular node may meet a threshold requirement so that the codeword is discarded. Such an error may be prevented by placing the columns of $V_{opt}$ in the same order at various levels of tree structure 500 or arranging the columns of $V_{opt}$ and/or the columns of the codewords from the codebook in any suitable order.

In some embodiments, a decision may be made to determine which of the remaining codewords from the codebook (e.g., the codewords that have not been removed from consideration during the progression through tree structure 500) may be the best codeword for use in precoding. As described above, the decision may be based on any suitable criteria, for example, the decision may be based on which codeword is associated with the minimum distance to the optical codeword.

In some embodiments, the tree structure of the codewords in a codebook may be exploited. This may, for example, increase the efficiency, decrease the computational complexity, and/or reduce the time needed to search for the best codeword from a codebook. For example, in some embodiments, groups or subsets of codewords may have identical and/or substantially similar columns and/or rows. For example, every 8 codewords may share the same first column in a MIMO system wherein there are 4 transmitter, 2 data streams, and a 6-bit codebook (e.g., 64 codewords). Thus, it may be possible to perform only one calculation to determine the value of a node for multiple codewords where it may have otherwise been necessary to perform multiple calculations in, for example, tree structure 400 or tree structure 500 of FIGS. 4 and 5, respectively. For example, the first $N_S$ columns of nosed in tree structure 600 may contain only $2^{L/2}$ rows of nodes (e.g., $2^{L/2}$ subsets of codewords), as opposed to $2^L$ rows of nodes as in tree structure 400 and tree structure 500 of FIGS. 4 and 5, respectively. In some embodiments, node 602 in tree structure 600 of FIG. 6 may represent a calculation that may take place for a first subset of codewords that may contain, for example, codewords $W_1$ through $W_{2^{L/2}}$. Additionally, node 604 may represent a calculation that may take place for a different subset of codewords that may contain codeword $W_{2^L}$.

Figure 6:
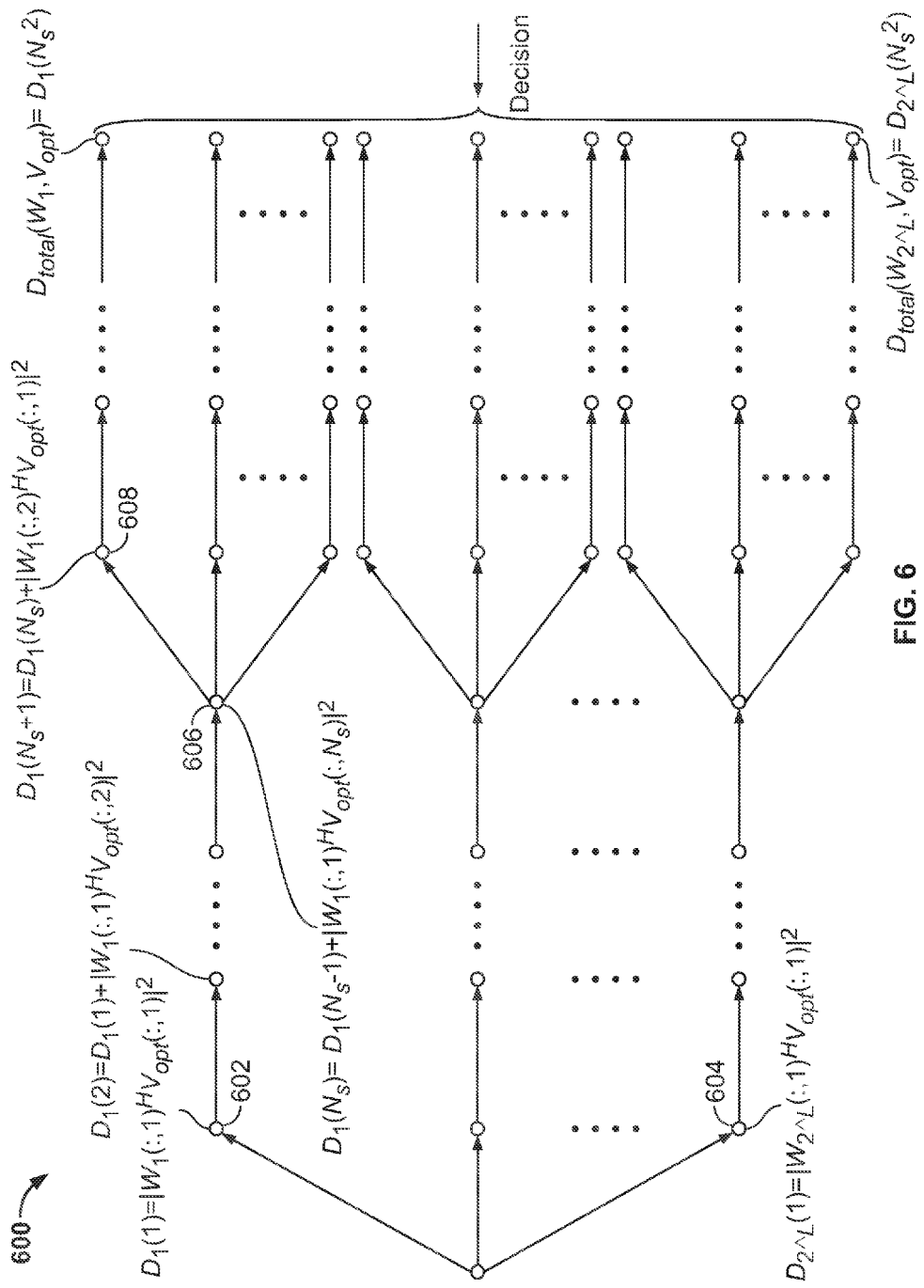
FIG. 6 shows a generalized tree structure diagram relating to a codebook search for the best available codeword for use in precoding that exploits the tree structure.

In some embodiments, the second column of codewords in a particular subset may be different, for example, codewords $W_1$ and $W_2$ may have identical first columns, but different second columns. Further, $W_1$ may have an identical second column to codeword $W_3$. Thus, $W_1$ and $W_2$ may be grouped into a first subset based on their identical first columns and $W_1$ and $W_3$ may be grouped into a second subset based on their identical second columns. The calculations related to the first subset may be represented by all nodes between and including node 602 and node 606. Each of these nodes may represent calculations related to the first column of the codewords in the first subset and the optimal codeword matrix. The second subset may be represented by one of the rows of nodes following node 606. As can be seen in FIG. 6, node 606 may split into a number of rows of nodes, wherein each may represent the calculations related to individual codewords or additional subsets of codewords, wherein the codewords in the additional subsets may share a column. For example, the row of nodes beginning with node 608 may relate to the second subset or just the individual codeword, $W_1$. In some embodiments, each of the $2^{L/2}$ rows of nodes in the first $N_S$ columns of nodes in tree structure 600 (e.g., the first $2^{L/2}$ subsets of codewords) may split into an additional $2^{L/2}$ rows of nodes, thus representing all $2^L$ codewords in the codebook.

In some embodiments, each subset may continue to split into additional subset until, for example, each node represents an individual codeword, as opposed to a subset of codewords. In such embodiments, each of the calculations related to each node may be performed thus leading to a total value for the distance and/or any other suitable parameter between each codeword in the codebook and the optimal codeword. Once the total value is computed for all codewords, a decision may be made to determine which codeword from the codebook is the best codeword for use in precoding. For example, the decision may be based on which codeword may be the minimum distance from the optimal codeword as described above, and/or the decision may be based on any other suitable criteria. In tree structure 600, the maximum $D_{total}$ may be associated with the best codeword.

Figure 5:
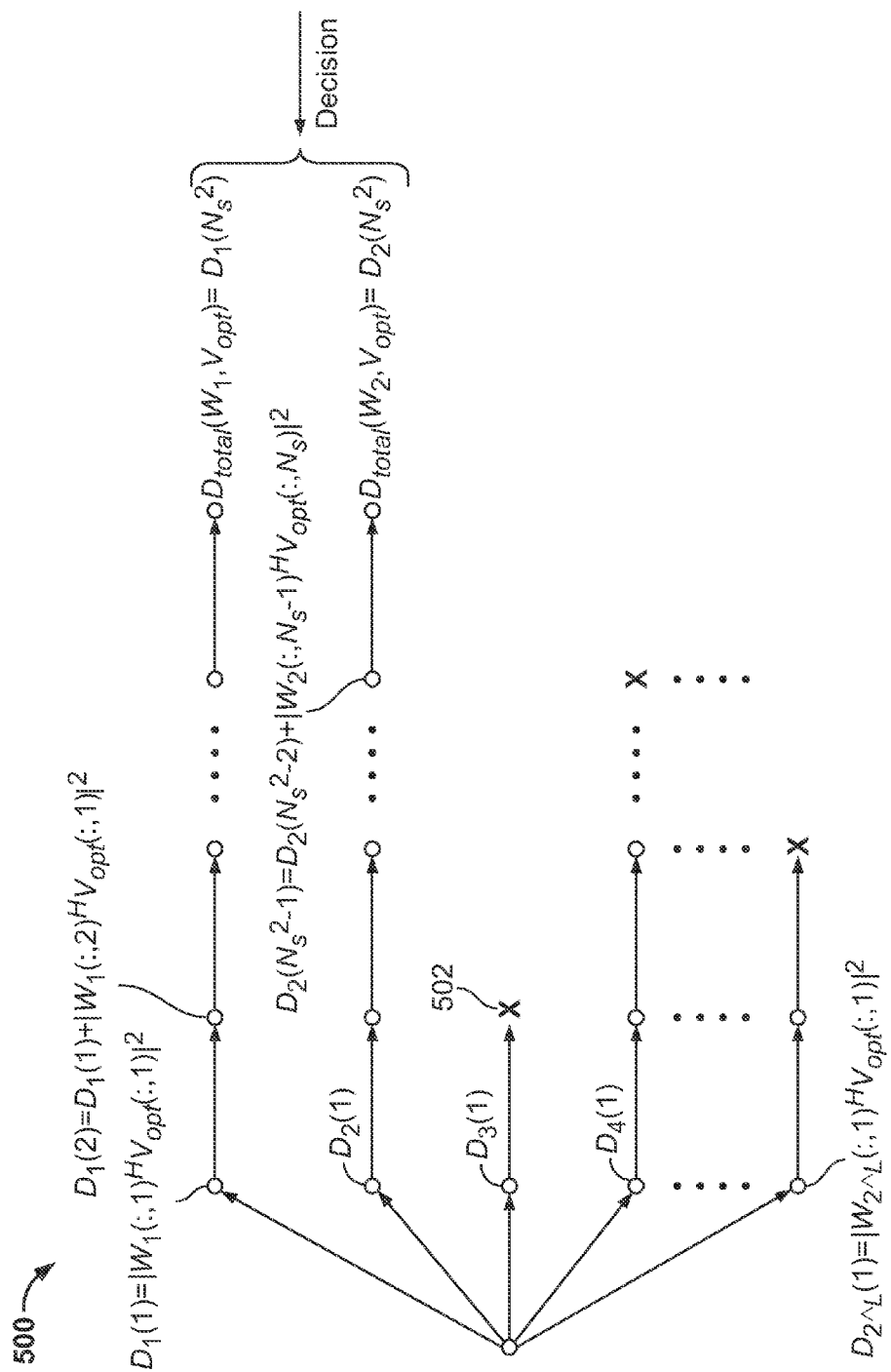
FIG. 5 shows a generalized tree structure diagram relating to a codebook search for the best available codeword for use in precoding that keeps the k-best nodes per step.
Figure 7:
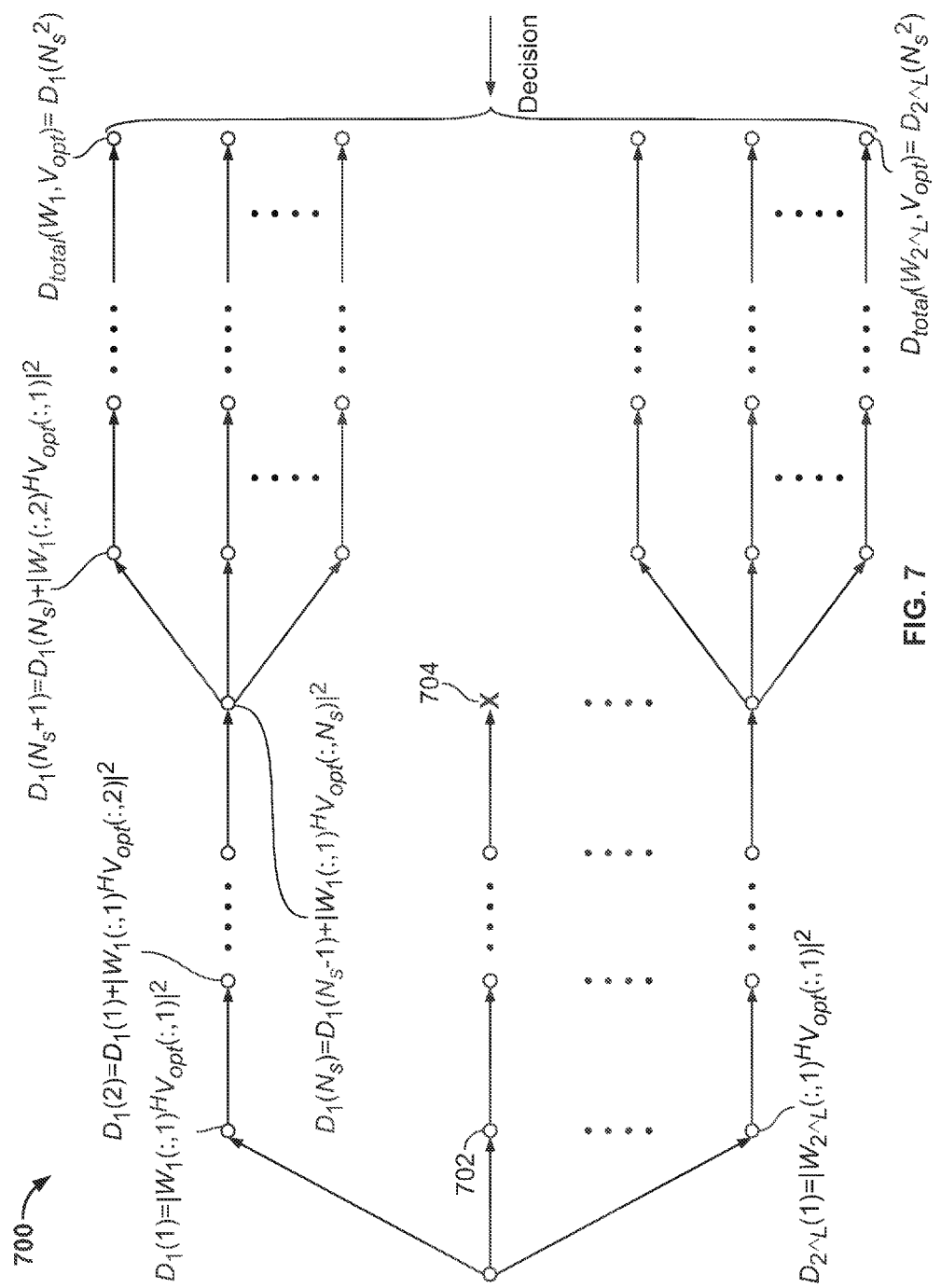
FIG. 7 shows a generalized tree structure diagram relating to a codebook search for the best available codeword for use in precoding that keeps the k-best nodes per step and exploits the tree structure.

In some embodiments, a k-best codeword search as described with respect to FIG. 5 may be applied to tree structure 600 of FIG. 6 to further increase the efficiency, decrease the computational complexity, and/or reduce the time needed to search for the best codeword from a codebook. Such an embodiment is illustrated in FIG. 7. Here, the nodes to the right of and including node 702 in FIG. 7 may represent a particular subset of codewords. The process may progress as described above with respect to FIGS. 4-6, however, at node 704 it may be determined that the calculated values associated with the subset of codewords are greater than or less than any suitable predetermined or adaptive threshold. Thus, it may be determined that none of the codewords in the subset are the best codeword for use in precoding given the current channel conditions and the optimal codeword. In such a case, the subset of codewords may be removed from consideration and no further calculations associated with the subset may be performed.

In some embodiments, the k-best subsets of codewords may be kept for further calculations at every step through tree structure 700, while the other, for example, $2^{L/2}$-k subsets of codewords may be removed from consideration, wherein k may represent any suitable integer. In some embodiments, the k-best subset may be kept for further calculations at every step through tree structure 700, while the other, for example, $2^L$-k codewords may be removed from consideration, wherein k may represent any suitable integer. In some embodiments, the k-best subset determination may take place at any suitable iteration through the nodes of tree structure 700. Fro example, the k-best determination may take place after every other column of nodes is analyzed. Alternatively, whether the k-best subset determination takes place may vary from iteration to iteration and/or may be adaptive. Furthermore, the value of k may vary iteration to iteration and may be adaptive. In some embodiments, the adaptive nature of the k-best determination may be based on the calculations that may be made in tree structure 700.

In some embodiments, a decision may be made to determine which of the remaining codewords within a subset and/or individual codewords from the codebook (e.g., the codewords from subsets and/or individual codewords that have not been removed from consideration during the progression through tree structure 700) may be the best codeword for use in precoding. As described above, the decision may be based on any suitable criteria, for example, the decision may be based on which codeword is associated with the minimum distance to the optimal codeword.

Figure 8:
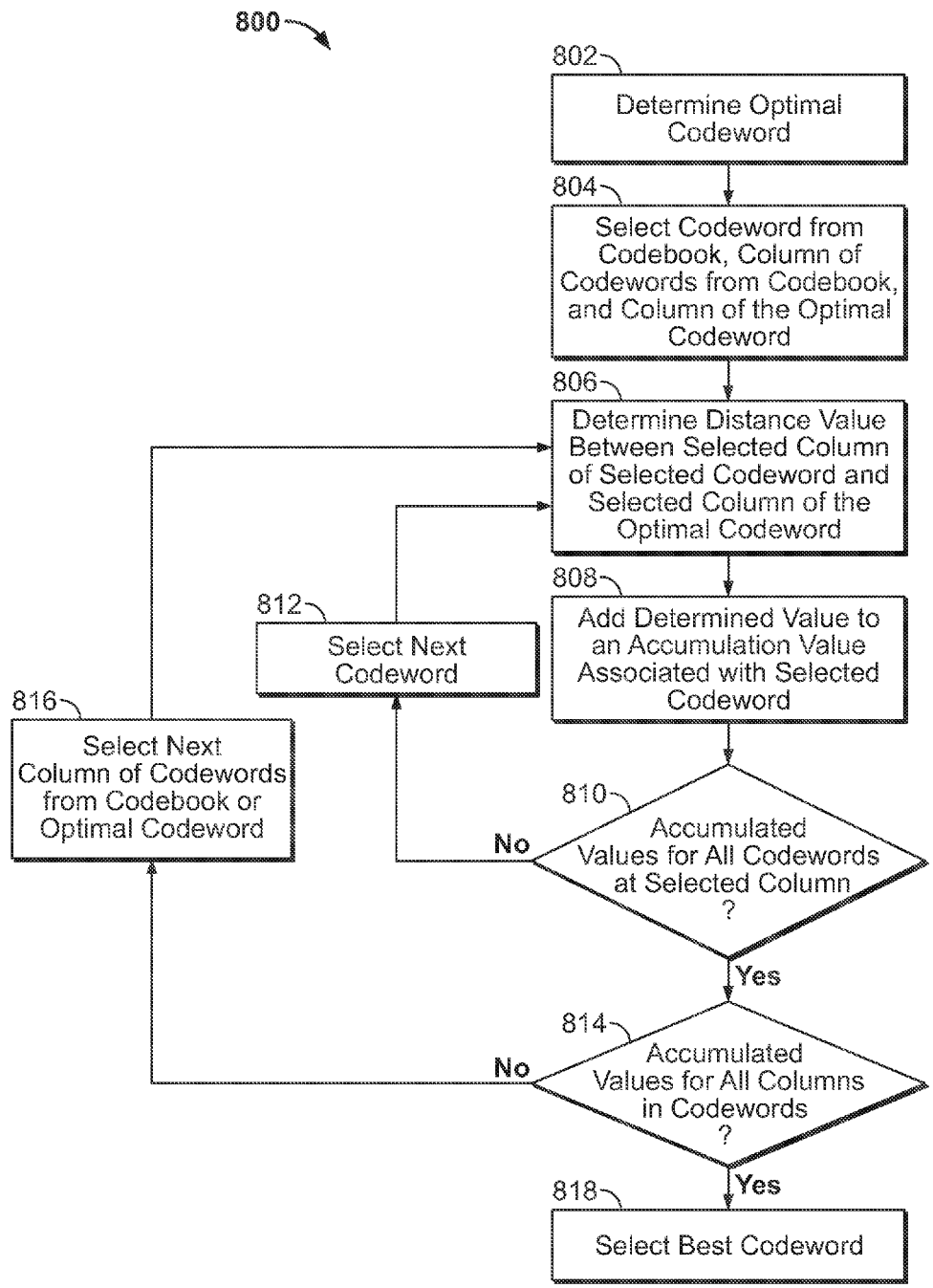
FIG. 8 shows an illustrative flow diagram for a method of searching through a codebook for the best available codeword for use in precoding based on the generalized tree structure of FIG. 4.

Referring now to FIG. 8, illustrative flow diagram 800 is shown for a method of searching through a codebook for the best available codeword for use in precoding, wherein the method may be based on a tree search process, such as the tree searches described with respect to FIGS. 4-7. The process illustrated by flow diagram 800 may be implemented through any suitable means, for example, it may be implemented in software and/or hardware. At step 802, the optimal codeword may be determined. The optimal codeword may be determined through any of the methods described above. At step 804, a first codeword from a codebook may be selected for analysis. Additionally, a first column of the selected codeword and/or a first column of the optimal codeword may be selected for analysis. At step 806, any suitable distance value and/or any other suitable parameter may be calculated based on the selected codeword, optimal codeword, and selected columns. For example, the squared magnitude of the vector-vector inner product between selected columns of the selected codeword and optimal codewords may be determined and/or any of the nodal calculations described with respect to FIGS. 4-7 may be calculated at step 806. The value(s) calculated at step 806 may be added to an accumulation value associated with the selected codeword at step 808. At step 810, it may be determined if values have been calculated at step 806 and added to an accumulation value at step 808 for all the codewords in the codebook for the selected columns. If one or more codeword has not been analyzed at the selected columns, a next codeword in the codebook may be selected for analysis at step 812. In such a case, the process may progress back to step 806 and step 808 for analysis of the newly selected codeword.

Alternatively, if all codewords have been analyzed at the selected columns, the process may progress to step 814, where it may be determined if a value has been calculated at step 806 and added to an accumulation value at step 808 for all columns of the codewords in the codebook and/or all the columns of the optimal codeword. If there are still more columns that need to be analyzed, the process may proceed to step 816, where a next column of the codewords from the codebook and/or a next column of the optimal codeword may be selected for analysis. In such a case, the process may progress back to step 806 and step 808 for analysis of the newly selected columns. Alternatively, if all columns have been analyzed for all codewords in the codebook and the optimal codeword, the process may proceed to step 818.

At step 818, the best codeword for precoding given the current channel conditions and/or the optimal codeword may be selected. The best codeword may be associated with the maximum or minimum accumulated value determined through step 806 and step 808, depending on what parameters were calculated at step 806. For example, if the squared magnitude of the vector-vector inner product between selected columns of the selected codeword and optimal codewords was determined at step 806, the best codeword may be associated with the maximum accumulated value, as described above.

Figure 9:
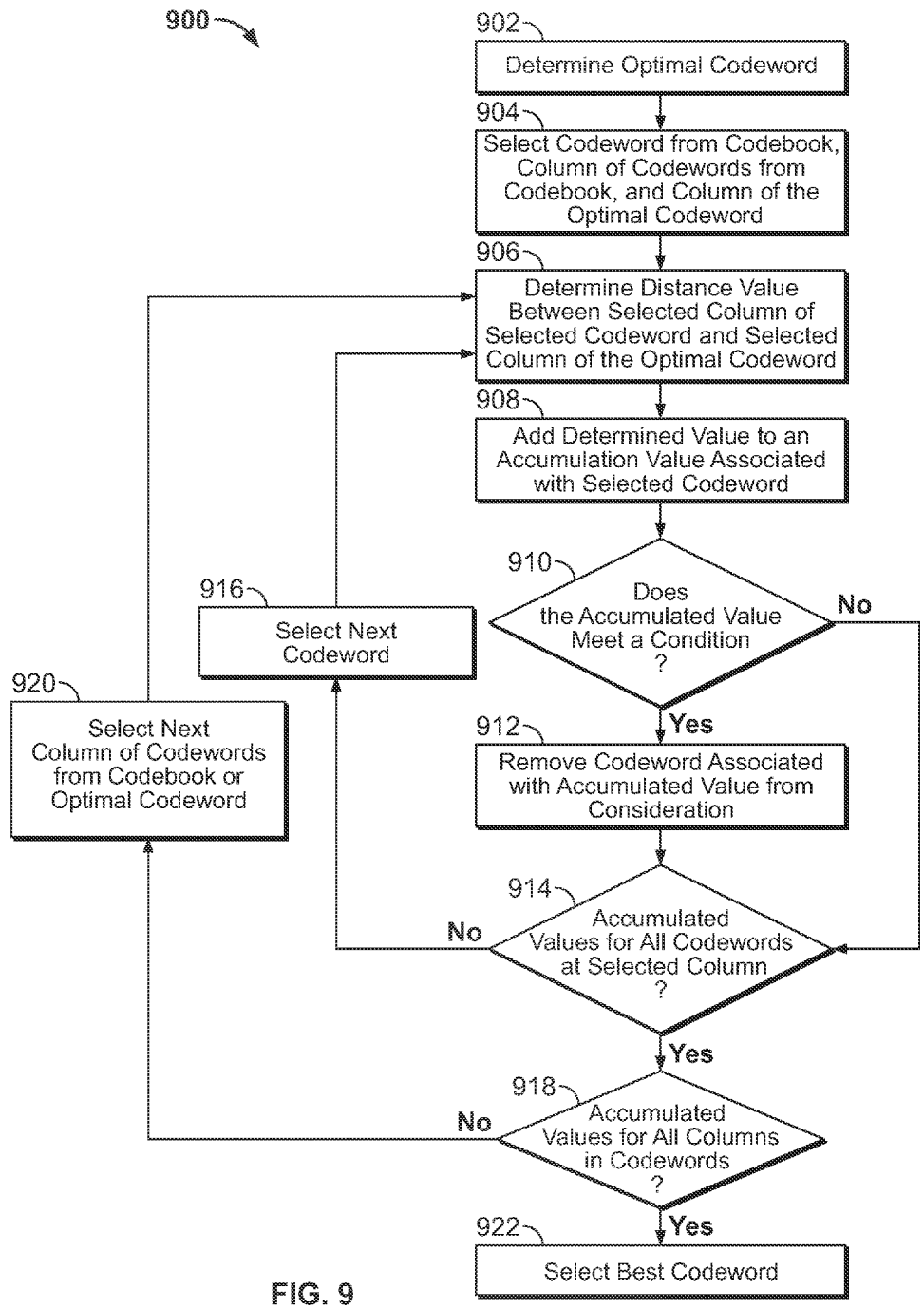
FIG. 9 shows an illustrative flow diagram for a method of searching through a codebook for the best available codeword for use in precoding based on the generalized tree structure of FIG. 5.

Referring now to FIG. 9, illustrative flow diagram 900 is shown for a method of searching through a codebook for the best available codeword for use in precoding, wherein the method may be based on a tree search process, such as the tree searches described with respect to FIGS. 4-7 and may also include search criteria, such as the k-best search criteria described above with respect to FIGS. 5 and/or 7. The process illustrated by flow diagram 900 may be implemented through any suitable means, for example, it may be implemented in software and/or hardware. In some embodiments, steps 902 through 908 may be substantially similar to steps 802 through 808 of FIG. 8, respectively.

At step 910, it may be determined if the accumulated value of step 908 meets a particular condition, for example, the conditions described with respect to FIGS. 5 and/or 7. For example, it may be determined that the accumulated value associated with the selected codeword is greater than or less than ay suitable predetermined or adaptive threshold. If this is indeed the case, the process may proceed to step 912 where the codeword may be removed from consideration. In some embodiments, a predetermined or adaptive number of codewords may be removed after any suitable iteration, while the k-best codewords may remain for further analysis, wherein k may be any suitable integer.

If the accumulated value does not meet the condition at step 910, the process may skip step 912 and proceed to step 914, and subsequently may proceed to step 916. In some embodiments, step 914 and step 916 may be substantially similar to step 810 and step 812 of FIG. 8, respectively. Alternatively, if all codewords have been analyzed at the selected columns, the process may progress to step 918, and subsequently step 920, which may be substantially similar to step 814 and step 816 of FIG. 8, respectively. After progressing through step 918, the process may proceed to step 922, which may be substantially similar to step 818 of FIG. 8.

Figure 10:
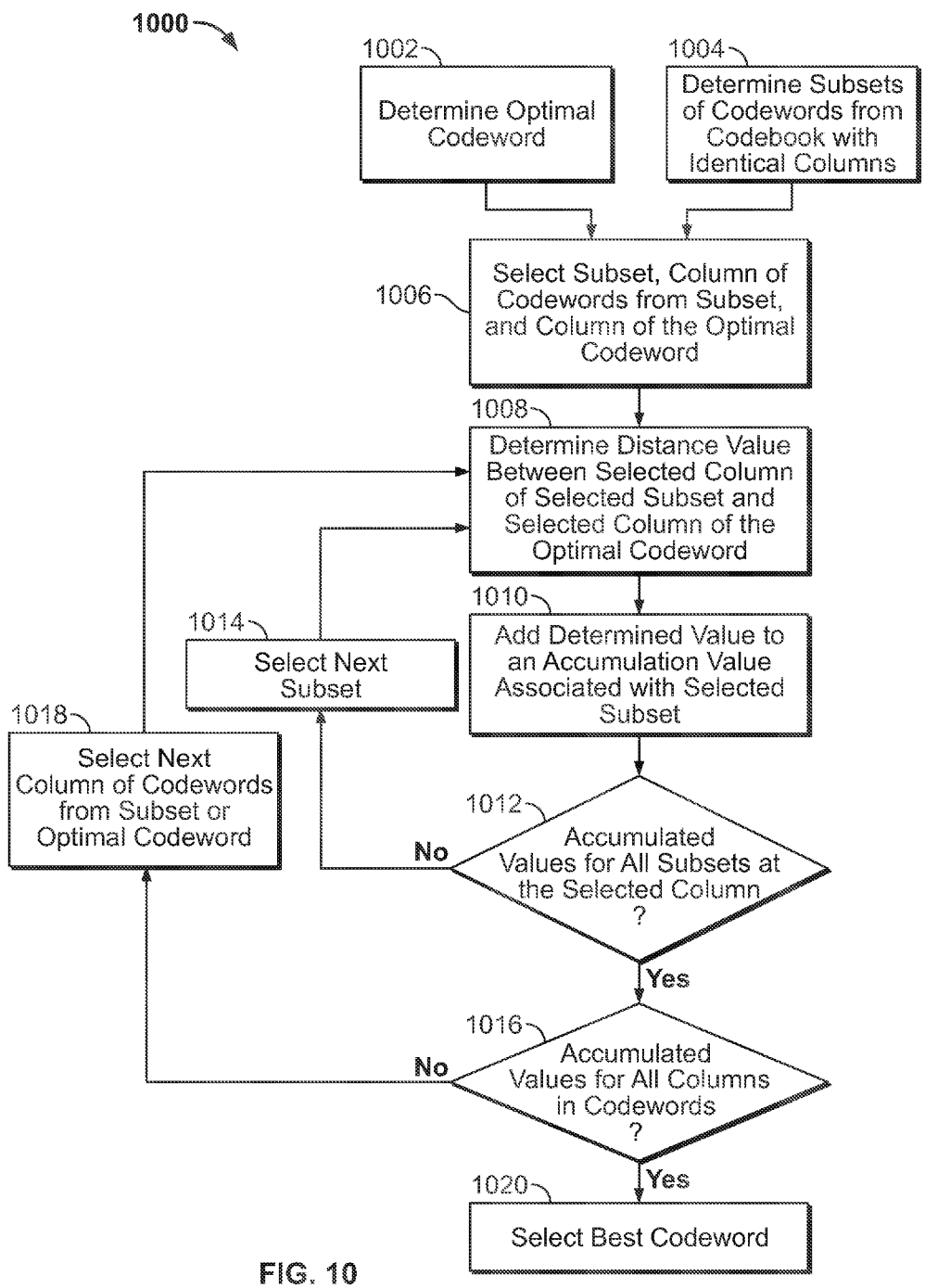
FIG. 10 shows an illustrative flow diagram for a method of searching through a codebook for the best available codeword for use in precoding based on the generalized tree structure of FIG. 6.

Referring now to FIG. 10, illustrative flow diagram 1000 is shown for a method of searching through a codebook for the best available codeword for use in precoding, wherein the method may be based on a tree search process, such as the tree searches described with respect to FIGS. 4-7 and may also exploit the tree structure and properties of the codewords in a codebook as described above with respect to FIGS. 6 and/or 7. The process illustrated by flow diagram 1000 may be implemented through any suitable means, for example, it may be implemented in software and/or hardware. At step 1002, the optimal codeword may be determined. The optimal codeword may be determined through any of the methods described above. At step 1004, subsets of codewords may be determined. As described above with regard to FIGS. 6 and 7, codewords may be grouped into subsets of codewords based on shared features. For example, the subsets of codewords may be grouped based on a common column shared among multiple codewords. Once the optimal codeword and subsets of codewords are determined, the process may proceed to step 1006, where a first subset of codewords may be selected for analysis. Additionally, a column that is shared by all or most of the codewords in the selected subset and/or a first column of the optimal codeword may be selected for analysis.

At step 1008, any suitable distance value and/or any other suitable parameter may be calculated based on the selected subset, optimal codeword, and selected columns. For example, the squared magnitude of the vector-vector inner product between selected columns of the selected subset and optimal codewords may be determined at step 1008, as described above. The value(s) calculated at step 1008 may be added to an accumulation value associated with the selected subset at step 1010. At step 1212, it may be determined if values have been calculated at step 1008 and added to an accumulation value at step 1010 for all subsets for the selected columns. If one or more subset has not been analyzed at the selected columns, a next subset may be selected for analysis at step 1014. In such a case, the process may progress back to step 1008 and step 1010 for analysis of the newly selected subset.

Alternatively, if all subsets have been analyzed at the selected columns, the process may progress to step 1016, where it may be determined if a value ahs been calculated at step 1008 and added to an accumulation value at step 1010 for all shared columns of codewords in all the subsets and/or the columns of the optimal codeword. If there are still more columns that need to be analyzed, the process may proceed to step 1018, where a next column of the selected subset and/or a next column of the optimal codeword may be selected for analysis. In such a case, the process may progress back to step 1008 and step 1010 for analysis of the newly selected columns. Alternatively, if all shared columns of codewords in all the subsets and all columns of the optimal codeword have been analyzed, the process may proceed to step 1020, which may be substantially similar to step 818 and/or step 912 of FIGS. 8 and 9, respectively. In some embodiments, before proceeding to step 1020, the process may proceed to steps substantially similar to those illustrated by flow diagrams 800 and 900 of FIGS. 8 and 9, respectively. In such embodiments, columns and/or codewords not analyzed in flow diagram 1000 (e.g., due to the configuration of the subsets) may be analyzed so that all codewords under consideration are fully analyzed before selection of the best codeword.

Figure 11:
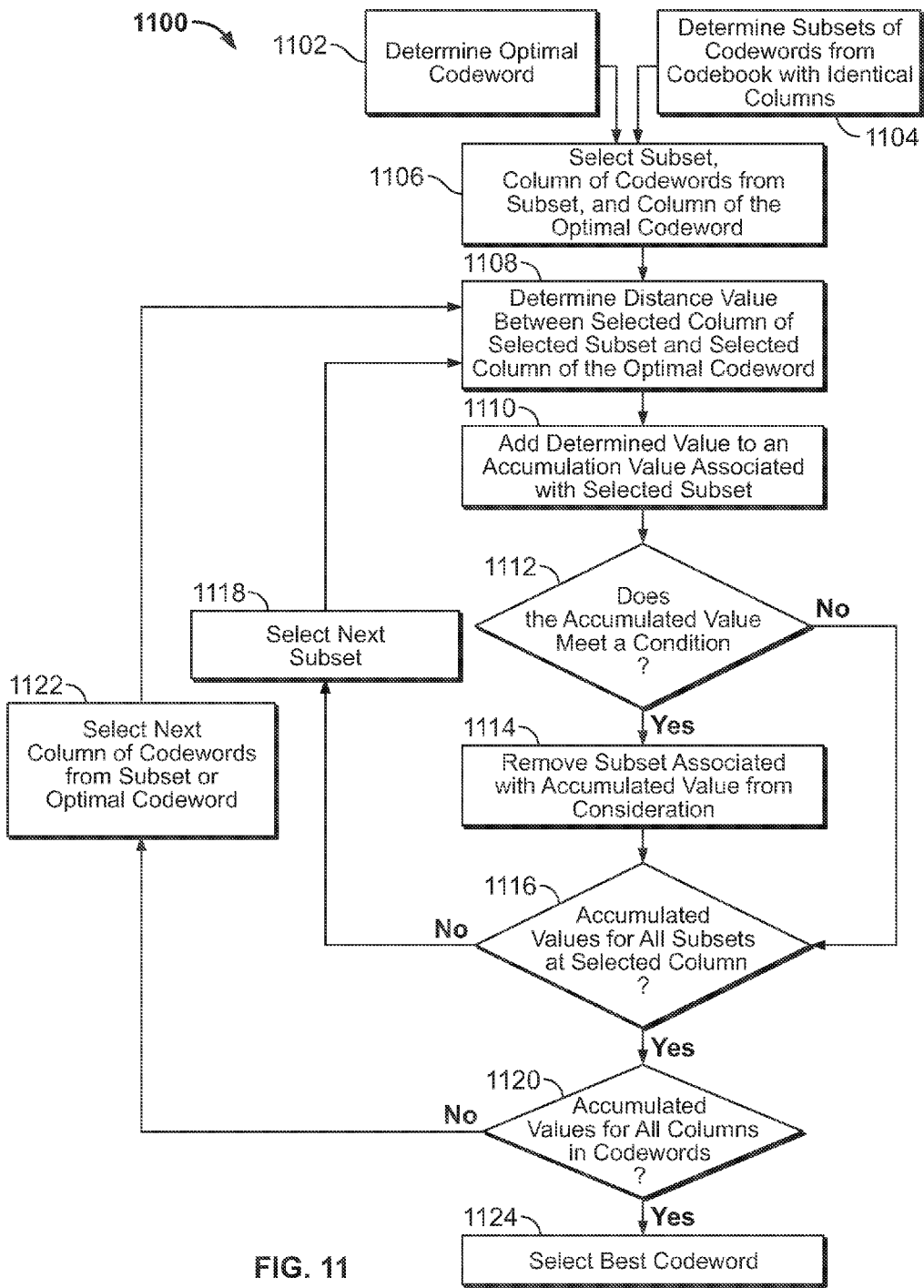
FIG. 11 shows an illustrative flow diagram for a method of searching through a codebook for the best available codeword for use in precoding based on the generalized tree structure of FIG. 7.

Referring now to FIG. 11, illustrative flow diagram 1100 is shown for a method of searching through a codebook for the best available codeword for use in precoding, wherein the method may be based on a tree search process, such as the tree searches described with respect to FIGS. 4-7 and may exploit the tree structure and properties of the codewords in a codebook as described above with respect to FIGS. 6, 7, and 10. Furthermore, the method may also include search criteria, such as the k-best criteria described above with respect to FIGS. 5, 7, and/or 9. The process illustrated by flow diagram 1100 may be implemented through any suitable means, for example, it may be implemented in software and/or hardware. In some embodiments, steps 1102 through 1108 may be substantially similar to steps 1002 through 1008 of FIG. 10, respectively.

At step 1112, it may be determined if the accumulated value of step 1110 meets a particular condition, for example, the conditions described with respect to FIGS. 5, 7, and/or 9. For example, it may be determined that the accumulated value associated with the selected subset is greater than or less than any suitable predetermined or adaptive threshold. If this is indeed the case, the process may proceed to step 1114 where the subset may be removed from consideration. In some embodiments, any suitable predetermined or adaptive number of subsets and/or codewords may be removed after any suitable iteration, while the k-best subsets and/or codewords may remain for further analysis, wherein k may be any suitable integer.

If the accumulated value does not meet the condition at step 1112, the process may skip step 1114 and proceed to step 1116, and then, subsequently, may proceed to step 1118. Step 1116 and step 1118 may be substantially similar to step 1012 and step 1014 of FIG. 10. Alternatively, if all subsets have been analyzed at the selected columns, the process may progress to step 1120 and subsequently to step 1122 and step 1124, which may be substantially similar to steps 1016, 1018, and 1020 of FIG. 10, respectively.

Figure 12:
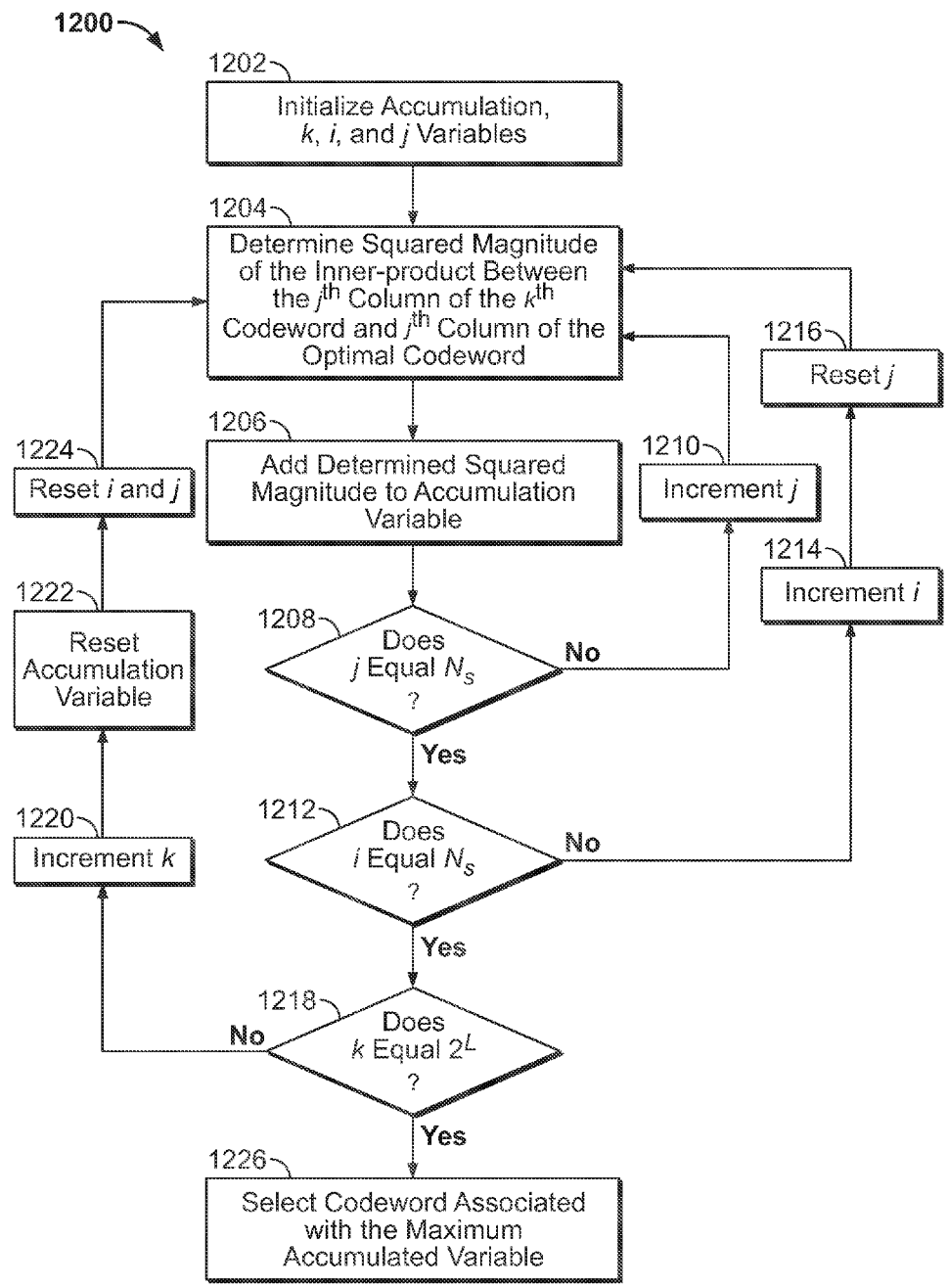
FIG. 12 shows an illustrative flow diagram for a method of searching through a codebook for the best available codeword for use in precoding using a recursive algorithm.

In some embodiments, a recursive algorithm may be used utilized to perform a codeword search instead of or in addition to the tree search processes described above in regards to FIGS. 4-11. Referring now to FIG. 12, illustrative flow diagram 1200 is shown for a method of searching through a codebook for the best available codeword for use in precoding, wherein a recursive algorithm may be utilized. Such a recursive algorithm may be implemented in software and/or hardware through the use of nested for-loops or any other suitable looping and/or recursive method. At step 1202, variables k, i, and j and an accumulation variable may be initialized. Here, k may represent the $k^{th}$ codeword in a codebook which may contain, for example, $2^L$ codewords. Variables i and j may represent counters that keep track of, for example, which column of the optimal codeword and $k^{th}$ codeword is being used in a particular calculation. The accumulation variable may be a vector, matrix, integer, or any other suitable variable representation in software and/or hardware capable of storing accumulation values associated with all $2^L$ codewords in the codebook. The initializing process that may take place at step 1202 may initialize only the accumulation value associated with the $k^{th}$ codeword, or alternatively, every accumulation value associated with all $2^L$ codewords in the codebook. Those skilled in the art will appreciate that the aforementioned variables may be initialized in any suitable manner and may represent any suitable feature within the recursive algorithm in any suitable manner without departing from the scope of the present invention. For example, variables i and j may represent counters that keep track of rows instead of or in addition to the columns of the $k^{th}$ codeword and optimal codeword.

At step 1204, the squared magnitude of the inner-product between the $j^{th}$ column of the $k^{th}$ codeword and $i^{th}$ column of the optimal codeword may be calculated. This calculation may be substantially similar to inner-product calculations shown in equations (17) and (18) as described above, however, any suitable calculation and/or distance metric may be used at step 1204. The initializing that may take place at step 1202 may insure that the calculations of step 1204 begin with, for example, the first codeword in the codebook and first columns of the first codeword and optimal codeword.

At step 1206, the determined squared magnitude from step 1204 may be added to the accumulation variable, wherein the accumulation variable may be associated with a particular codeword from the codebook, for example, the $k^{th}$ codeword. At step 1208, a check may be made to determine if variable j equals $N_S$. $N_S$ may be a fixed variable that may represent the number of columns in a given codeword and/or the optimal codeword. In some embodiments, as described above, $N_S$ may be associated with the number of data streams in a MIMO communications system. If j does not equal $N_S$, this may signify that a squared magnitude inner-product calculation has not been made for each of the $N_S$ columns of the $k^{th}$ codeword. If this is indeed the case, j may be incremented at step 1210, for example, by one, and the algorithm may loop back to step 1204 t calculate a new squared magnitude inner-product value based on the incremented j value and add the new squared magnitude value to the accumulation variable at step 1206.

Alternatively, if j does equal $N_S$, the algorithm may be proceed to step 1212 where a check may be made to determine if variable i equals $N_S$. If i does not equal $N_S$, this may signify that a squared magnitude inner-product calculation has not been made for each of the $N_S$ columns of the optimal codeword. If this is indeed the case, i may be incremented at step 1214, for example, by one, j may be reset or reinitialized at step 1216, and the algorithm may proceed through steps 1204 and 1206 as described above.

Alternatively, if i does equal $N_S$, then the algorithm may be proceed to step 1218 where a check is made to determine if k equals $2^L$. As described above, there may be $2^L$ codewords in the given codebook. Thus, if k does not equal $2^L$, this may signify that the algorithm has not calculated an accumulation value for every codeword in the codebook. In such a case, the algorithm may proceed to step 1220 where k may be incremented by, for example, one. From step 1220, the algorithm may proceed to step 1222 to reset, initialize, or reinitialize the accumulation value associated with the $k^{th}$ codeword. From step 1222, the algorithm may proceed to step 1224 where i and j may be reset or reinitialized, then, the algorithm may proceed through steps 1204 and 1206 as described above.

Alternatively, if k does equal $2^L$, this may signify that the algorithm has calculated an accumulation value for every codeword in the codebook and the selection of the best codeword may be completed at step 1226. At step 1226, a best codeword may be selected for use in precoding as described above with regard to FIGS. 1-11. With regard to step 1226, the best codeword may be the codeword that is associated with the maximum accumulated value as determined in step 1206. In some embodiments, the best codeword may be associated with any other suitable parameter, depending on what is calculated at step 1204. For example, if a different suitable distance metric calculation is performed at step 1204, the best codeword may be associated with the minimum accumulated value, as opposed to the maximum accumulated value.

Figure 13:
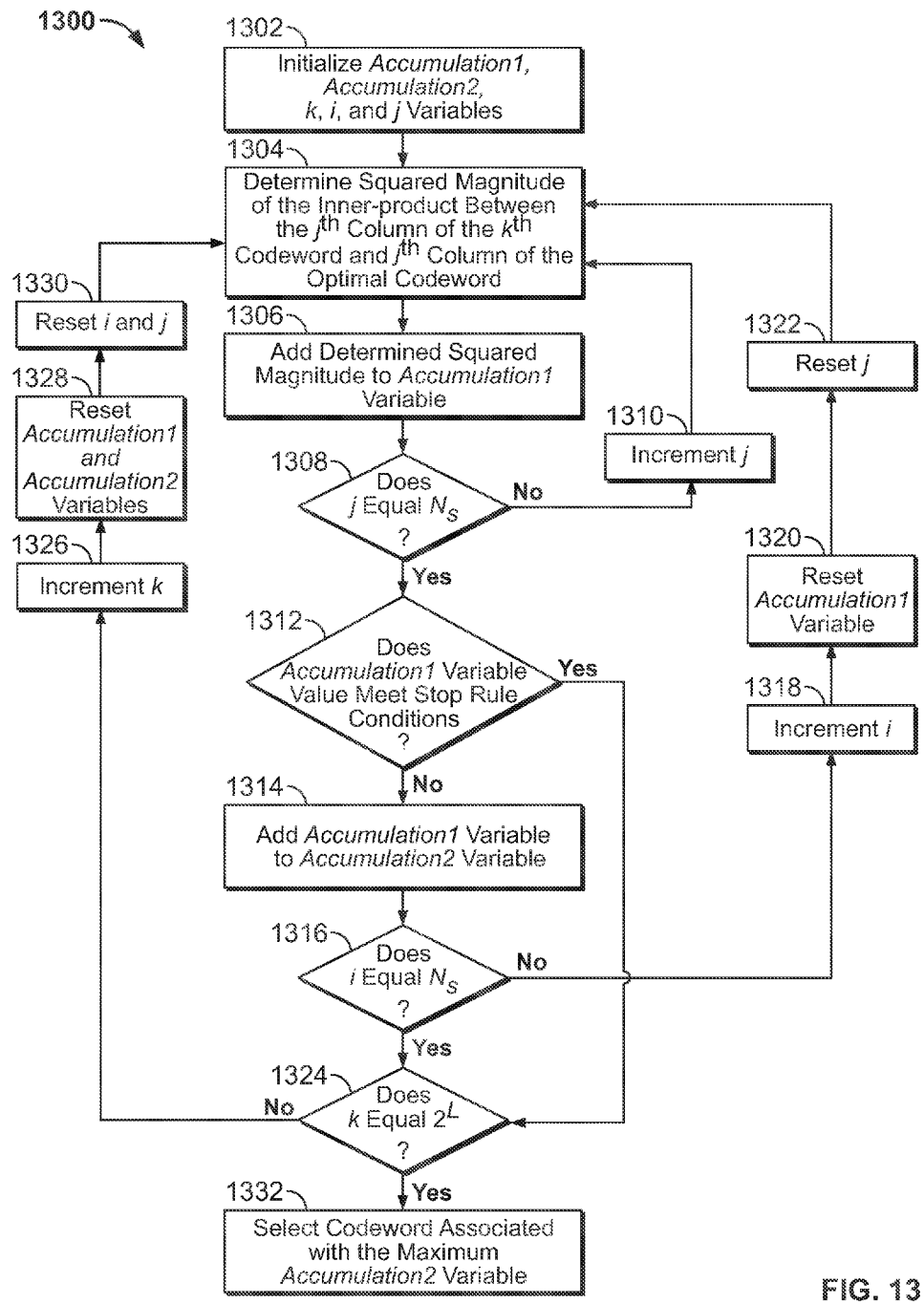
FIG. 13 shows an illustrative flow diagram for a method of searching through a codebook for the best available codeword for use in precoding using a recursive algorithm with stopping rules.

Referring now to FIG. 13, illustrative flow diagram 1300 is shown for a method of searching through a codebook for the best available codeword for use in precoding, wherein a recursive algorithm with stop rules may be utilized. Such stop rules may increase the efficiency of the codeword search and reduce the computational complexity and time needed to determine the best codeword to use for precoding by reducing the number of computations that may need to be performed. Such a recursive algorithm may be implemented in software and/or hardware through the use of nested for-loops or any other suitable looping method. At step 1302, which may be substantially similar to step 1202 of FIG. 12, variables k, i, and j may be initialized as well as two accumulation variables, accumulation1 and accumulation2. Here, k may represent the $k^{th}$ codeword in a codebook which may contain, for example, $2^L$ codewords. Variables i and j may represent counters that keep track of, for example, which column of the optimal codeword and $k^{th}$ codeword is being used in a particular calculation. Accumulation variable, accumulation1, may be used as a temporary variable to temporarily store a calculated and/or accumulated value associated with a particular codeword. Accumulation variable, accumulation2, may be a vector, matrix, integer, or any other suitable variable representation in software and/or hardware capable of storing accumulation values associated with all $2^L$ codewords in the codebook. The initialization process that may take place at step 1302 may initialize only the accumulation2 value associated with the $k^{th}$ codeword, or alternatively, every accumulation value associated with all $2^L$ codewords in the codebook. Those skilled in the art will appreciate that the aforementioned variables may be initialized in a suitable manner and may represent any suitable feature within the recursive algorithm in any suitable manner without departing from the scope of the present invention. For example, variables i and j may represent counters that keep track of rows instead of or in addition to the columns of the $k^{th}$ codeword and optimal codeword.

At step 1304, which may be substantially similar to step 1204 of FIG. 12, the squared magnitude of the inner-product between the $j^{th}$ column of the $k^{th}$ codeword and $i^{th}$ column of the optimal codeword may be calculated. At step 1306, which may be substantially similar to step 1206 of FIG. 12, the squared magnitude of the inner-product calculated at step 1304 may be added to the accumulation variable, accumulation1. This variable may be associated with the $k^{th}$ codeword or may be a variable which only temporarily stores information associated with the $k^{th}$ codeword. At step 1308, a check may be made to determine if variable j equals $N_S$. $N_S$ may be a fixed variable that may represent the number of columns in a given codeword and/or the optimal codeword. In some embodiments, as described above, $N_S$ may be associated with the number of data streams in a MIMO communications system. If j does not equal $N_S$, this may signify that a squared magnitude inner-product calculation has not been made for each of the $N_S$ columns of the $k^{th}$ codeword. If this is indeed the case, j may be incremented at step 1310, for example, by one, and the algorithm may loop back to step 1304 to calculate a new squared magnitude inner-product value based on the incremented j value and add the new squared magnitude value to the accumulation variable, accumulation1, at step 1306.

Alternatively, if j does equal $N_S$, the algorithm may proceed to step 1312 where a check may be made to determine if the accumulation variable, accumulation1, meets one or more stop rule conditions. A stop rule may be any suitable condition wherein, if the stop rule condition is met, particular calculations and/or codewords may be removed from consideration in determining the best codeword. In some embodiments, this may be equivalent to breaking out of a loop, such as a for-loop in an algorithm. For example, a stop rule may remove codewords from consideration if accumulation1 is less than a threshold at a particular iteration of accumulation that may take place at step 1306 and/or step 1314 (step 1314 is described in further detail below). As an additional example, a stop rule may halt the distance calculation that may take place at step 1304 for a particular codeword. As an additional example, a particular stop rule condition may involve determining whether accumulation1 is less than, or in alternate embodiments, greater than, any suitable predetermined threshold value. If accumulation1 meets the stop rule condition, the value of accumulation1 may be considered negligible and accumulation1 may not be used in any further calculations in the best codeword determination. Such an embodiment may remove insignificant columns of the $k^{th}$ codeword and/or the optimal codeword from consideration. Alternatively, if accumulation1 meets the stop rule condition, the $k^{th}$ codeword as a whole (e.g., not only selected columns of a codeword) may be considered negligible and removed from any further calculations in the best codeword determination.

In some embodiments, the stop rule condition may be fixed, such that, for example, only a predetermined number of columns may be used in the best codeword determination. For example, it may be desired to approximate the chordal distance by limiting the calculations such the only the first column of the optimal codeword may be used. This may be represented by the equation, as follows:

$$W_{best} = \underset{1 \leq k \leq 2^L}{\mathrm{argmin}} D_{chor}(V_{opt}, W_k) \approx \underset{1 \leq k \leq 2^L}{\mathrm{argmax}} \sum_{(i,j) \in \Omega}^{N_S} |W_k(:, i)^H V_{opt}(:, j)|^2, \quad (21)$$

wherein, $$\Omega = \{(i,1); 1 \leq i \leq N_S\}. \quad (22)$$

Here, the best codeword for use in precoding may be chosen based on an approximated minimum chordal distance between the codeword $W_k$ and the optimal codeword, $V_{opt}$, wherein the approximation may be based on the sum the squared magnitude vector-vector inner-product multiplications between all the columns of all the $k^{th}$ codeword and only the first column of the optimal codeword. Equations (21) and (22) may be modified in any suitable manner to approximate any suitable distance calculation and/or any other suitable parameter.

For illustrative purposes, equations (21) and (22) may be applied to step 1312 of flow diagram 1300 by checking whether all the columns of the $k^{th}$ codeword and the first column of the optimal codeword were utilized in determining the current value of accumulation1 variable. If so, then the stop condition may be met and the process may proceed to step 1324 to check if all codewords in the codebook have been analyzed, which is explained in further detail below. In some embodiments, the stop rule condition may be implemented by limiting the upper bounds at variables i, j, and k. For example, instead of separately checking if stop rule condition is met, step 1308 may be modified such that a check is made to determine if j is equal to any suitable value less than $N_S$, instead of $N_S$ itself. This may be equivalent to a fixed stop rule as described above in that such a modification to step 1308 may remove one or more columns of the codewords from the codebook from consideration. Alternatively or additionally, a substantially similar modification may be made to step 1316 and/or step 1324, which check whether all the columns of the optimal codeword have been examined and whether all the codewords in the codebook has been examiner, respectively. This is discussed in greater detail below.

In some embodiments, the stop rule conditions may be variable and/or adaptive based on particular conditions. For example, a threshold value may change over time depending on particular channel conditions or any other suitable condition. Those skilled in the art will appreciate that the any suitable stop rule condition may be implemented in any suitable manner without departing from the scope of the present invention. Furthermore, those skilled in the art will appreciate that any suitable stop rule check may be made at any suitable point in the algorithm, in any suitable manner, and may be applied to any suitable parameter and/or variable.

In the illustrated example, if accumulation1 does not meet the stop rule condition, the algorithm may proceed to step 1314 where accumulation1 may be added to a value in accumulation2 which may be associated with the $k^{th}$ codeword. Then the algorithm may proceed to step 1316, where a check may be made to determine if variable i equals $N_S$. As mentioned above, if accumulation1 does meet the stop rule condition, the algorithm may jump to step 1324, thereby skipping steps 1314 and 1316. This may prevent accumulation1 from being added to accumulation2 and thus the current value of accumulation1 may not influence the selection of the best codeword.

Referring again to step 1316, if i does not equal $N_S$, this may signify that a squared magnitude inner-product calculation has not been made for each of the $N_S$ columns of the optimal codeword. If this is indeed the case, i may be incremented at step 1318, for example, by one, accumulation1 and j may be reset or reinitialized at steps 1320 and 1322, respectively, and the algorithm may proceed through steps 1304 and 1306 as described above. Alternatively, if i does equal $N_S$, this may signify that a squared magnitude inner-product calculation has been made for each of the $N_S$ columns of the optimal codeword and the algorithm may proceed to step 1324.

At step 1324, a check is made to determine if k equals $2^L$. As described above, there may be $2^L$ codewords in the given codebook. Thus, if k does not equal $2^L$, this may signify that the algorithm has not addressed every codeword in the codebook in the determination of accumulation values. In such a case, the algorithm may proceed to step 1326 where k may be incremented by, for example, one. From step 1326, the algorithm may proceed to step 1328 to reset, initialize, or reinitialize accumulation values, accumulation1 and accumulation2, that may be associated with the $k^{th}$ codeword. From step 1328, the algorithm may proceed to step 1330 where i and j may be reset or reinitialized, then, the algorithm may proceed through steps 1304 and 1306 as described above.

Alternatively, if k does equal $2^L$, this may signify that the algorithm has addressed every codeword in the codebook in the determination of accumulation values and the selection of the best codeword may be completed at step 1332. At step 1332, a best codeword may be selected for use in precoding as described above with regard to FIGS. 1-12. With regard to step 1332, the best codeword may be the codeword that is associated with the maximum accumulated value in accumulation variable, accumulation2, as determined in steps 1304, 1306, and 1314. In some embodiments, the best codeword may be associated nay other suitable parameter, depending on what is calculated at step 1304. For example, if a suitable distance metric calculation is performed at step 1304, the best codeword may be associated with the minimum accumulate values, as opposed to the maximum accumulated value.

Those skilled in the art will appreciate that the recursive algorithms described with regard to FIGS. 12 and 13 may be combined in any suitable manner with the tree search processes described with regard to FIGS. 4-11 without departing from the scope of the present invention. For example, the recursive algorithms described in FIGS. 12 and 13 may exploit the codeword tree structure as described with regard to FIGS. 10 and 11. For example, the recursive algorithms may determine the squared magnitude of the inner-product between a column of in a subset of codewords and a column of the optimal codeword instead of or in addition to the calculations described above in connection with FIGS. 12 and 13. Furthermore, those skilled in the art will appreciate that all the steps in the flow diagrams of FIGS. 8-13 may be completed in any suitable order that may differ from the order described herein and in any suitable manner without departing from the scope of the present invention. Those skilled in the art will appreciate that the invention may be practiced by other than the described embodiments, which are presented for the purpose of illustration rather than of limitation.

What is claimed is:

1. A method of performing a search for a codeword from a plurality of codewords, the method comprising:
   determining an optimal codeword;
   determining a first set of distance values between the plurality of codewords and the optimal codeword;
   selecting a subset of codewords from the plurality of codewords;
   determining a second set of distance values between the subset of codewords and the optimal codeword;
   accumulating, using electronic hardware, the second set of distance values with the first set of distance values to generate an accumulated set of distance values; and
   selecting a codeword from the subset of codewords based on a minimum distance value in the accumulated set of distance values.

2. The method of claim 1, wherein the search is a tree search.

3. The method of claim 1, wherein the subset of codewords is comprised of k-best codewords from the plurality of codewords, wherein k is an integer.

4. The method of claim 1, wherein each codeword in the subset has at least a column in common.

5. The method of claim 1, further comprising removing codewords not included in the subset of codewords from consideration.

6. The method of claim 1, wherein the second set of distance values is determined at least partially based on the squared magnitude of the inner-product between columns of the subset of codewords and columns of the optimal codeword.

7. The method of claim 1, further comprising removing a first codeword from the plurality of codewords from consideration when the at least a portion of the first codeword meets a stop rule condition.

8. The method of claim 7, wherein the at least a portion of the first codeword removed from consideration is at least one column of the first codeword.

9. The method of claim 7, wherein the stop rule condition is adaptive or fixed.

10. The method of claim 9, wherein the stop rule condition is met when a first distance value of the accumulated set of distance values is below a threshold value.

11. A system of performing a search for a codeword from a plurality of codewords, the system comprising:
    a processor configured to:
      determine an optimal codeword;
      determine a first set of distance values between the plurality of codewords and the optimal codeword;
      select a subset of codewords from the plurality of codewords;
      determine a second set of distance values between the subset of codewords and the optimal codeword;
      accumulate the second set of distance values with the first set of distance values to generate an accumulated set of distance values; and
      select a codeword from the subset of codewords based on a minimum distance value in the accumulated set of distance values.

12. The system of claim 11, wherein the search is a tree search.

13. The system of claim 11, wherein the subset of codewords is comprised of k-best codewords from the plurality of codewords, wherein k is an integer.

14. The system of claim 11, wherein each codeword in the subset has at least a column in common.

15. The system of claim 11, wherein the processor is further configured to remove codewords not included in the subset of codewords from consideration.

16. The system of claim 11, wherein the second set of distance values is determined at least partially based on the squared magnitude of the inner-product between columns of the subset of codewords and columns of the optimal codeword.

17. The system of claim 11, wherein the processor is further configured to remove a first codeword from the plurality of codewords from consideration when at least a portion of the first codeword meets a stop rule condition.

18. The system of claim 17, wherein the at least a portion of the first codeword removed from consideration is at least one column of the first codeword.

19. The system of claim 17, wherein the stop rule condition is adaptive or fixed.

20. The system of claim 19, wherein the stop rule condition is met when a first distance value of the accumulated set of distance values is below a threshold value.

* * * * *